US005794252A

United States Patent [19]

Bailey et al.

[11] Patent Number: 5,794,252

[45] Date of Patent: Aug. 11, 1998

[54] REMOTE DUPLICATE DATABASE FACILITY FEATURING SAFE MASTER AUDIT TRAIL (SAFEMAT) CHECKPOINTING

[75] Inventors: Bruce W. Bailey, Cupertino; Malcolm Mosher, Jr., Los Gatos, both of Calif.

[73] Assignee: Tandem Computers, Inc., Cupertino, Calif.

[21] Appl. No.: 767,452

[22] Filed: Dec. 16, 1996

Related U.S. Application Data

[63] Continuation-in-part of Ser. No. 704,111, Aug. 28, 1996, which is a continuation of Ser. No. 377,182, Jan. 24, 1995, abandoned.

[51] Int. Cl.$^6$ ..................................................... G06F 17/30
[52] U.S. Cl. ............... 707/202; 707/182.05; 707/182.09; 707/182.14
[58] Field of Search .................... 707/202; 395/182.05, 395/182.09, 182.14

[56] References Cited

U.S. PATENT DOCUMENTS 5,561,795  10/1996  Sarkar ................................. 707/202

OTHER PUBLICATIONS

Guerrero, Jorge, "RDF: An Overview", Tandem Systems Review, Oct. 1991, pp. 34–43.
Sent, Wouter, et al., "RDF: Synchronization", Tandem Systems Overview, Summer 1992, pp. 6–23.

*Primary Examiner*—Paul R. Lintz
*Attorney, Agent, or Firm*—Gary S. Williams; Flehr Hohbach Test Albritton & Herbert LLP

[57] ABSTRACT

A local computer system has local database, application programs that modify the local database, an a transaction manager that stores audit records in a local audit trail reflecting those application program modifications to the local database. A remotely located computer system has a backup database. A remote data duplication facility (RDF) is partially located in the local computer system and partially in the remote computer for maintaining virtual synchronization of the backup database with the local database. The RDF includes an extractor process executed by said local computer system, and a receiver process and a plurality of updater processes executed by the remote computer system. The extractor process extracts audit records from a local audit trail and transmits those records to the receiver process. The receiver process distributes the audit records into one or more image trail files that are associated with a particular updater process. Each updater process reads the audit records in its assigned image trail file and initiates redo operations of database modifications denoted in at least a subset of the audit records against the backup database. Each image trail file has a corresponding image trail buffer that is used to accumulate a number of audit records before they are stored in the corresponding image trail file. Before an updater process applies an audit record against the backup database, it requests from the receiver process the status of the transaction associated with the audit record. Status audit records are stored in a transaction status table as well as in a master image trail file. The RDF system herein described provides a method and system for assuring that each audit record is preserved in the system in the event a failure occurs to any of the processes in the RDF.

24 Claims, 24 Drawing Sheets

Receiver Context Record 270

| IT | MAT position for last audit record written to IT buffer | Image Trail Timestamp | 390 |
|---|---|---|---|
| MIT | 1101 | | safeMATposition for reading Transaction Status Table |
| AIT 1 | 1102 | | |
| AIT 2 | 1009 | | Restart MIT position for generating Transaction Status Table — 395 |
| AIT 3 | 923 | | |
| AIT 4 | 1106 | | Receiver.StopUpdatersCnt — 391 |

Receiver Context Record 270
| IT | MAT position for last audit record written to IT buffer | Image Trail Timestamp | |
|---|---|---|---|
| MIT | 1101 | | safeMATposition for reading Transaction Status Table — 390 |
| AIT 1 | 1102 | | |
| AIT 2 | 1009 | | Restart MIT position for generating Transaction Status Table — 395 |
| AIT 3 | 923 | | |
| AIT 4 | 1106 | | Receiver.StopUpdatersCnt — 391 |
FIGURE 7A
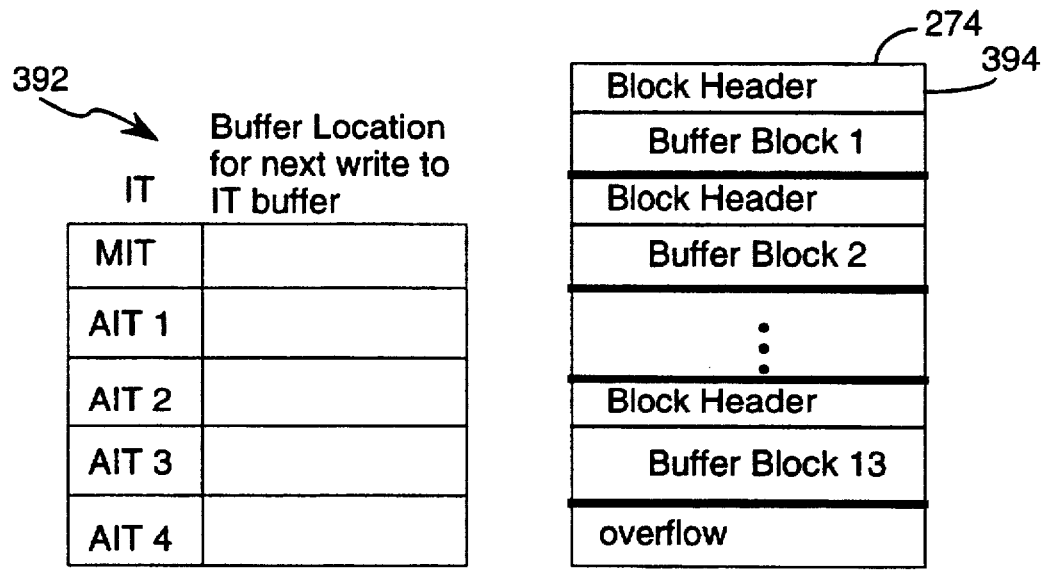
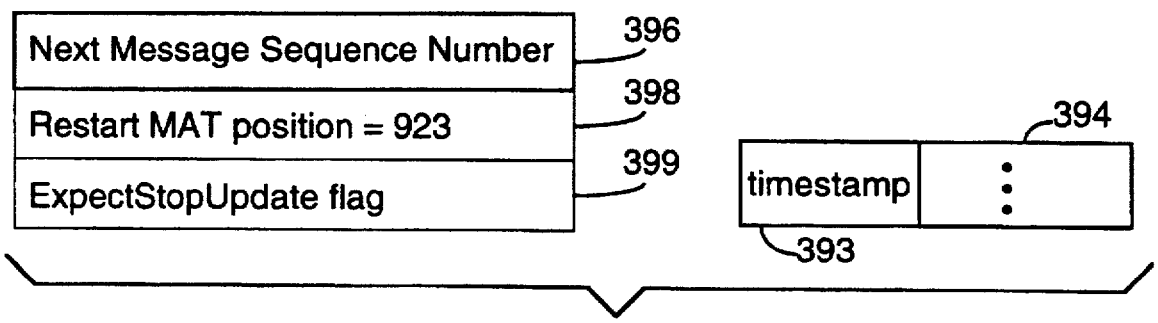
FIGURE 7B Updater Status Table 400

| Updater | IT File | LimitPosition in IT File | Last Reported MIT file position | Last Reported IT file position |
|---|---|---|---|---|
| 1 | MIT | | | |
| 2 | MIT | | | |
| 3 | MIT | | | |
| 4 | AIT1 | | | |
| 5 | AIT1 | | | |
| ⋮ | ⋮ | ⋮ | ⋮ | ⋮ |

Transaction Status Table (TST) 144

414 — MIT position for updating TST

| Trans. ID | Status (Commit or Abort) | MIT Position | MAT Position |
|---|---|---|---|
| S100003 | | | |
| S100004 | | | |
| S100006 | | | |
| ⋮ | ⋮ | ⋮ | ⋮ |
| S100256 | | | |

REMOTE DUPLICATE DATABASE FACILITY FEATURING SAFE MASTER AUDIT TRAIL (SAFEMAT) CHECKPOINTING

This application is a continuation-in-part of application Ser. No. 08/704,111, filed Aug. 28, 1996, which was a continuation of application Ser. No. 08/377,152, filed Jan. 24, 1995.

The present invention relates generally to database management systems and particularly to a database management system in which a "remote duplicate database facility" monitors changes made to a database on a local system and maintains a copy of that database on a remote system.

BACKGROUND OF THE INVENTION

The purpose of a "remote duplicate database facility" (hereinafter an "RDF") in a database management system (DBMS) is to provide a higher degree of fault tolerance than can be provided through conventional fault tolerance system architectures involving the use of "shadowed" disk storage (i.e., storing all data to two disk storage systems simultaneously) and parallel computers where one computer takes over if the other fails.

In conventional distributed computer systems designed to perform transaction management, one or more transaction managers (i.e., management processes) generate and store transaction audit entries in an audit trail. Most audit entries denote a database table record event, such as an addition, deletion or modification of a specified database table record in a specified database table. Commit/abort audit entries indicate that a specified transaction has committed or aborted. Other audit entries may be used to denote yet other types of transactions, such as transactions involving restructuring of the database tables (e.g., adding an additional alternate index to a database table or changing the number of partitions for a database table), while still other audit entries may denote other events not relevant to this document.

A RDF system monitors the information added to the audit trail so as to monitor changes made to a database on a primary system (often called the "local system" or "primary system"), and maintains a backup copy of that database on a remote system by applying the same changes to a backup database on a remotely located backup system (often called the "remote system" or "remote backup system"). In this manner the backup database on the remote system is kept continuously up to date by the RDF with changes made to the local system.

The remote system is preferably located sufficiently far from the primary system that even a widespread disaster, such as loss of power over a large geographic area, that adversely affects the primary system will not affect the remote backup system. The use of an RDF system makes it possible to switch business applications from the primary system to the remote backup system in a short period of time, preferably in a matter of minutes. Additionally, if a planned shutdown of the primary system is necessary, business applications can be stopped and immediately restarted on the backup system to access the replicated database.

PRIOR ART TANDEM RDF SYSTEM

FIGS. 1 and 2 represent the basic architecture of Tandem Computer's RDF system prior to the present invention. The computer system 100 shown in FIG. 1 has a transaction management facility 102 that writes audit entries to a master audit trail (MAT) 104. The audit entries indicate changes made to "audited files" on "RDF protected volumes" 106 of a primary database 108 on a primary system 110. All RDF protected volumes are configured to write all transaction audit records to the MAT 104.

The RDF system 120 includes processes on both the primary (local) computer system 110 and a remote backup computer system 122. The RDF 120 maintains a replicated database 124 (also called the backup database) by monitoring changes made to "audited files" on "RDF protected volumes" 106 on a primary system and applying those changes to corresponding backup volumes 126 on the backup computer system 122. An "audited file" (sometimes called an "RDF audited file") is a file for which RDF protection has been enabled, and an "RDF protected volume" is a logical unit of disk storage for which RDF protection has been enabled. Thus, an RDF protected volume may include both audited and unaudited files.

On the primary computer system 110, an RDF extractor process 130 reads the master audit trail (MAT) 104, which is a log maintained by the transaction management facility (TMF) of all database transactions that affect audited files, and sends any audit records associated with RDF-protected volumes to an RDF receiver process 132 on the backup computer system.

The MAT 104 is stored as a series of files with sequentially numbered file names. The MAT files are all of a fixed size (configurable for each system), such as 64 Mbytes. The TMF 102 and Extractor 130 both are programmed to progress automatically (and independently) from one MAT file to the next.

The extractor process 130 appends a timestamp to each audit record that it extracts from the master audit trail 104. The appended timestamp is the timestamp of the last transaction to complete prior to generation of the audit record in the MAT 104. The resulting record is called an audit image record, or image record. The extractor process stores each audit image record in a message buffer 142 having a size of about 28 K bytes in the preferred embodiment. The extractor process reads up to 28 K bytes of audit records from the MAT 104 at a time, and after each such read operation the resulting message buffer 142 is transmitted to the receiver process 132. The extractor process 130 waits for an acknowledgment message from the receiver process 132 before continuing its processing of audit records in the MAT 104.

The receiver process 132 writes all audit records received from the extractor to a Master Image Trail (MIT) 136 as well as to zero or more auxiliary Image Trails (AITs) 138. The contents of all the image trails 136, 138 are identical. The RDF updater processes 134 on the remote backup system 122 read the audit records from either a master image trail 136 or an auxiliary image trail 138 and apply only audit records associated with committed transactions to the backup database 124. Each RDF-protected volume 106 on the primary computer system 110 has its own updater process 134 on the backup computer system 110 that is responsible for applying audit records to the corresponding backup volume 126 on the backup computer system 110 so as to replicate the audit protected files on that volume. Audit records associated with aborted transactions on the primary system are never applied to the database on the remote backup computer system 122.

The audit image records in each image trail 136, 138 are typically read and processed by two to ten updaters 134. Each updater 134 reads all the audit image records in the corresponding image trail, but utilizes only the audit image records associated with the primary disk volume 106 for which that updater is responsible. Thus, in a system having a large number of RDF protected disk volumes, each updater 134 will utilize only a small fraction of the audit image records in the corresponding image trail 136, 138. For instance, in a system with four image trails (136,138) and sixteen updaters (four per image trail), only about six percent of the audit records read by each updater (on average) will be relevant to that updater.

The receiver process 132 processes the commit/abort records received from the extractor, as they are written to the master image trail, by adding the transaction status information in each commit/abort record to a transaction status table (TST) 144, which indicates the status of each transaction that has either committed or aborted.

Since the updaters 134 only initiate redo operations on the audit image records for transactions that have committed, the updaters 134 require the transaction status information in the transaction status table 144. To obtain that information, each updater 134 requests transaction status information from the receiver process 132 whenever it reads an audit image record for a database table that the updater is assigned to replicate and for which the transaction status is unknown to the updater.

The receiver process 132, in response to each status request, sends the requesting updater process 134 a message that includes not only the status of the transaction identified in the status request, but also the status of the next hundred or so transactions in the transaction status table 144 that completed after the identified transaction. If the receiver process 132 does not yet know the status of the identified transaction, it does not respond to the status request until it receives a commit/abort record concerning the identified transaction.

When an updater process 134 reaches the end of file of the image trail 136,138 to which it is assigned, it performs a wait for a preselected amount of time, such as two to ten seconds before attempting to read more audit image records.

Monitor process 140 accepts user commands for controlling the RDF 120. Monitor process 140 also accepts user requests for status information and requests status information from the various processes in the RDF 120 in order to respond to those user requests.

Referring to FIG. 2, the extractor process 130 has a backup extractor process 150 and the receiver process 132 has a backup receiver process 152. The extractor backup process is created by the extractor process 130 and is always resident on a different CPU 160 from the extractor process 130 so as to improve the chances that a hardware failure of the extractor process's CPU will not affect the backup extractor process. Similarly, the receiver backup process 152 is created by the receiver process 132 and is always resident on a different CPU 162 from the receiver process 132.

The extractor backup process 152 is dormant while the primary extractor process 130 remains active. An operating system procedure 156 periodically checks on the primary extractor process 130 to determine if it is still alive. When the operating system determines that the primary extractor process 130 has failed, the extractor backup process 150 takes over execution of the extractor procedures at a takeover location specified by the last checkpoint performed by the primary extractor process 130 (as will be explained in more detail next) utilizing the last checkpointed information 158 from the primary extractor process to establish the backup extractor's process context.

A "checkpoint" operation is defined in this document to mean the storage of information by one process in a backup process. Thus, checkpoints store information in primary memory, not on durable disk or other secondary memory storage. As implemented in Tandem's RDF systems, a checkpoint is a blocking operation. That is, after a checkpoint the primary process performs no useful work until the checkpoint has been acknowledged by the backup process.

The extractor process 130 performs a checkpoint whenever (A) it finishes reading one MAT file and begins reading a next MAT file, (B) whenever the extractor receives acknowledgment from the receiver process 132 that a message buffer has been received, and (C) in a number of special context change circumstances not relevant here. When the extractor process 130 performs a checkpoint, the information 158 transferred by the primary extractor process 130 to its backup process includes:

a takeover location,
the extractor's current position in the MAT file; and
all data structures associated with processing audit records, including partially
processed audit records, the last seen commit/abort timestamp, and so on.

The extractor process 130 does not durably store a context record, except as part of an orderly shutdown of the extractor process. This durably stored context record is used at startup to determine where the extractor process 130 should start reading in the MAT 104.

In the prior art Tandem RDF 120, the transferred takeover location can be any point in the extractor process's programming.

In the prior art Tandem RDF 120, the receiver process 132 frequently performs checkpoint operations. More specifically, the receiver process 132 performs a checkpoint (A) upon receipt of a message buffer of audit information from the extractor process (before sending an acknowledgment reply message to the extractor process), (B) upon completion of a no-waited write to the image trail disk files (i.e., upon receipt of notification of successful writes to all the image trails from the associated disk processes), (C) whenever it fills up one set of image files and begins writing to a next set of image files, and (D) in a number of special context change circumstances not relevant here.

Whenever the receiver process 132 performs a checkpoint, the information 164 transferred by the primary receiver process 132 to its backup process 152 includes:

a takeover location,
the receiver's current position in the image files (i.e., the current end of file position for each image file, which is also the position for the next write operation to each of the image files); and
all data structures associated with processing audit records, including the complete message buffer received from the extractor process, partially processed blocks of data not yet written to image disk files, and an updater status table. The updater status table indicates the last reported image trail read position for each updater.

Immediately after the receiver 132 receives a message buffer of audit image records it performs a checkpoint, moving a copy of its context record and all the received data to its backup process. Then it sends an acknowledgment reply message back to the extractor process 130. Next, it writes a copy of the received audit image records into the master image trail 136 and into each auxiliary image trail 138. The master image trail 136 and each auxiliary image trail 138 are a series of disk files having sequentially assigned file names.

The receiver process 132 durably stores its context record every five seconds so as to durably store its current image trail file positions. This durably stored context record is used at startup to determine where the receiver process 132 should start writing data into the image trail files.

The entire context of the backup extractor process 150 is determined by the checkpoint information stored in its address space by the last checkpoint operation performed by the primary extractor process. When the backup extractor process starts up due to failure of the primary extractor process 130, the backup extractor process 150 does not perform any data structure initializations. Rather, it immediately starts execution at the takeover location provided by the last checkpoint and uses the checkpointed data structures as its own data structures.

In a similar manner, the entire context of the receiver process 152 is determined by the checkpoint information stored in its address space by the last checkpoint operation performed by the primary receiver process 132. When the backup receiver process 152 starts up due to failure of the primary receiver process 132, the backup receiver process 152 does not perform any data structure initializations. Rather, it immediately starts execution at the takeover location provided by the last checkpoint and uses the checkpointed data structures as its own data structures.

This method of primary/backup failover used in the prior art Tandem RDF requires (A) that checkpoints transmit all information needed by the corresponding backup process to resume execution immediately, and (B) that checkpoints be performed not only at all significant context changes, but at all points where failure to perform a checkpoint could result in the extractor and receiver becoming desynchronized.

While the RDF system 120 described above has functioned well in commercial use for years, it has been determined, through long experience, that the failover mechanism has a number of shortcomings, and that operating requirements associated with the failover mechanism have greatly limited the throughput (i.e., the number of database updates handled per second) of the RDF system 120. In particular, a primary shortcoming of the prior art failover mechanism is that there remain circumstances, while rare, in which a backup process will not have the information needed, causing the extractor and receiver to become desynchronized.

Two databases, such as the primary database and backup database are said to be "synchronized" if they both have identical contents, in terms of data configured for replication on the backup database. Two databases are said to be "virtually synchronized" if in the course of its normal operation (i.e., all relevant audit records are being transmitted to the remote backup system) the RDF can make up for any difference between the two databases, as in the case of a time lag between data arriving in the MAT file and being transmitted by the RDF to the backup database.

When the RDF catches up to the primary system, the two are once again fully synchronized.

In the prior art RDF system 120, there is no coordination between the extractor and receiver processes 130, 132 other than use of message sequence numbers in the message buffers transmitted from the extractor process 130 to the receiver process 132. The prior art RDF system simply assumes that virtual synchronization of the extractor and receiver processes is maintained at all times. Thus, the system does not provide an automatic system and method for the extractor and receiver to resynchronize in the event that desynchronization occurs. For instance, if receiver receives a message buffer with a wrong sequence number, the RDF system 120 would crash.

While such desynchronizations are rare, the mechanisms used by RDF system 120 to avoid desynchronization are complex, use a large percentage of the RDF's entire resources, and are not entirely failure proof.

In the prior art RDF system 120, the maximum number of image trails 136, 138 that the receiver can handle is seven. This limit is based on the receiver's checkpointing requirements, which absorb much of the receiver process's resources, and the I/O overhead associated with writing all audit information to the image trails.

Another shortcoming of the prior art RDF system 120 that limits the RDF system's throughput, is the requirement that the extractor process 130 wait until a message buffer is acknowledged by the receiver process 132 before the extractor process resumes processing more audit records. The RDF system 120 thus uses only one message buffer at a time. This requirement is based on the need to maintain virtual synchronization between the primary and backup systems. However, this "wait until reply" requirement greatly reduces the overall rate at which the extractor process 130 can process audit records.

Yet another shortcoming of the prior art RDF system 120, alluded to above, is that the updaters 134 (actually the disk processes called by the updaters) are inefficiently used in systems with large numbers of updaters (e.g., more than eight updaters) because only a small fraction of the records in the image trail processed by each updater will be relevant to that updater.

It is therefore a primary object of the present invention to provide an improved RDF failover mechanism that imposes significantly less overhead on the RDF system, while providing complete failover protection against all single process failures and all multiple process failures. It is thus an object of the present. invention to ensure the integrity of the RDF for any type of failure.

A related object of the present invention is to provide an RDF system with tight synchronization between the extractor and receiver processes and procedures that guarantee, regardless of the cause or type of failure, that the two will resynchronize automatically.

Another related object of the present invention is to provide a primary process to backup process failover mechanism for the extractor and receiver processes that does not rely on frequent checkpointing, thereby avoiding the high overhead associated with such checkpointing and the inherent complexity of such checkpointing.

Another object of the present invention is to make the process of sending audit records from the extractor process to the receiver process more efficient.

Yet another object of the present invention is to make the receiver and updater processes more efficient by delivering to each image trail only the audit records needed by the updater processes utilizing those image trails.

SUMMARY OF THE INVENTION

In summary, the present invention is a distributed computer database system having a local computer system and a remote computer system. The local computer system has a local database stored on local memory media, application programs that modify the local database, and a transaction manager that stores audit records in a local audit trail reflecting those application program modifications to the local database as well as commit/abort records indicating which of the transactions making those database modifications committed and which aborted. Each audit record has an associated audit trail position in the local audit trail, otherwise referred to as a MAT (master audit trail) position.

The remote computer system, remotely located from the local computer system, has a backup database stored on remote memory media associated with the remote computer system.

A remote data duplication facility (RDF) is partially located in the local computer system and partially in the remote computer for maintaining virtual synchronization of the backup database with the local database. The RDF includes an extractor process executed by said local computer system, and a receiver process and one or more updater processes executed by the remote computer system.

The extractor process extracts audit records from the local audit trail. It has a plurality of message buffers (four in the preferred embodiment) for buffering groups of the extracted audit records together and transmits each message buffer to said remote computer system when the buffer is full or a timeout occurs. Each transmitted message buffer has an associated sequence number. The sequence numbers for sequentially transmitted message buffers follow a predefined sequence. The extractor process continues, after transmitting any message buffer to the remote computer system, to buffer groups of extracted audit records in other ones of the message buffers and to transmit those message buffers to the remote computer system.

The receiver process stores an expected next message sequence number and a context record denoting a restart audit trail position value. The receiver process receives message buffers transmitted by the extractor process. It compares the message sequence number associated with each received message buffer with its locally stored expected next sequence number. If the two do not match, the receiver process transmits an error message to the extractor process. If the two do match, the receiver process responds by sending a reply message to the extractor process acknowledging receipt of the message buffer, updating the expected next message sequence number in accordance with the predefined sequence. It then distributes the audit records in the received message buffer to one or more image trails in the remote computer system and updates the restart audit trail position value based on the audit trail positions associated with said audit records in said received message buffer.

Each updater process, executed by the remote computer system, reads the audit records in an assigned image trail and initiates redo operations of database modifications denoted in at least a subset of the read audit records against the backup database.

The extractor process responds to each reply message acknowledging receipt of a message buffer by enabling reuse of that message buffer, and also responds to each error message by determining the restart audit trail position value stored by the receiver process and then extracting audit records from the local audit trail starting at that restart audit trail position value.

The receiver process distributes the audit records from the received message buffers to one or more image trails. A subset of the audit records are update audit records indicating database modifications associated with a particular transaction. Another subset of the audit records are commit/abort records indicating a status (e.g., abort or commit) of the transaction associated with one or more of the update audit records. Status audit records are stored in a master image trail, while update audit records are preferably stored in one or more auxiliary image trails. However, some or all of the update audit records can be stored in the master image trail.

Associated with each image trail is a buffer (which is actually organized as a set of two alternately used buffers).

The receiver process distributes the audit records from each received message buffer into one of the appropriate image trail buffers. The buffers are periodically flushed, storing the audit records in the associated image trails (i.e. durably stored files). Each updater process reads the update audit records from an assigned image trail and applies the specified modifications to its assigned portion of the backup database.

Before an updater process modifies the backup database as specified in a update audit record, it requests from the receiver process the status of the transaction associated with the audit record. Typically, the status of a transaction can be commit, indicating that the updater process is to perform the modification, or abort, indicating that the updater process is to abandon the modification. The receiver process retrieves the status from a copy of the commit/abort status audit record that is stored in a transaction status table. In addition, each updater process only processes records in its specified image trail up to a LimitPosition location in that image trail. The LimitPosition for each image trail is periodically updated by the receiver process each time the master image trail buffer is flushed to disk.

The integrity of both databases needs to be maintained despite failures that may occur in the local and remote computer system. While the use of volatile storage devices for the buffers and the transaction status table increases the throughput of the remote duplicate database facility, these devices are a problematic source of database inconsistency in the event of a failure. It is for this reason that the following features were incorporated into the present invention.

First, each buffer containing update audit records is flushed to its respective image trail before the associated commit/abort status audit records are stored in the master image trail. This ensures that an updater process has all the update audit records associated with a transaction before the transaction is processed.

Second, the restart position of the master image trail is maintained continuously. Whenever the master image trail buffer is flushed to the master image trail, a safeMATposition is updated in the receiver's context record, which reflects the MAT position of the last commit/abort record stored in the master image trail. The receiver process updates the transaction status table as the status audit records are received. When an updater process requests the status of a transaction, the receiver process will return the status only when the safeMATposition equals or exceeds the MAT position of the commit/abort record for the requested transaction. This ensures that a transaction is applied by the RDF to the backup database 124 either completely, or not at all, regardless of failures that may occur.

In an alternate embodiment, a responder process is utilized, which maintains the transaction status table and handles requests from the updater processes. The receiver process would be relieved of these tasks thereby making it more efficient to process message buffers and to distribute audit records. The responder process updates the transaction status table by reading commit/abort records from the master image trail. In rebuilding the transaction status table in response to a system failure, the responder reads the records in the master image file up to the location specified by the safeMATposition. Similarly, this embodiment ensures that transaction status information is provided to updater processes only for transactions whose audit records are all durably stored in image trail files.

Lastly, the receiver process also ensures that the end of file (EOF) positions for each of the image trails is properly restored when there is a failure to the remote computer system. When a file is not closed properly, which sometimes occurs in the case of a failure, the EOF positions are not updated to the correct position even though updated data resides in the file. Upon the restart of the receiver process, the correct EOF position is restored.

BRIEF DESCRIPTION OF THE DRAWINGS

Additional objects and features of the invention will be more readily apparent from the following detailed description and appended claims when taken in conjunction with the drawings, in which:

FIG. 7A is a block diagram of a receiver context record for the receiver process in a preferred embodiment of the present invention. FIGS. 7B-7D are block diagrams of data structures used by the receiver process in a preferred embodiment of the present invention.

DESCRIPTION OF THE PREFERRED EMBODIMENTS

Figure 3:
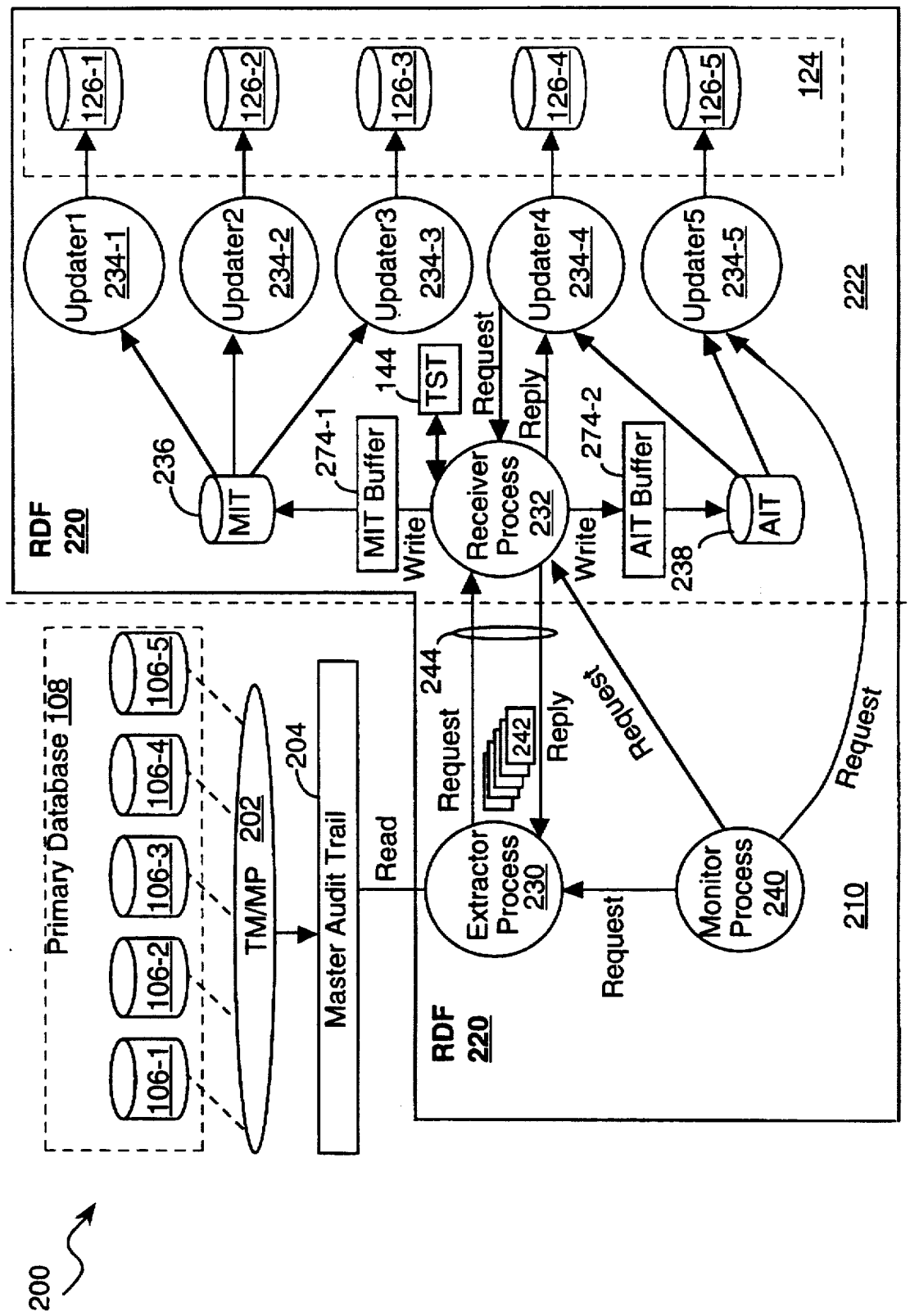
FIG. 3 is a block diagram of a database management system with a remote duplicate database facility in accordance with the present invention.
Figure 4:
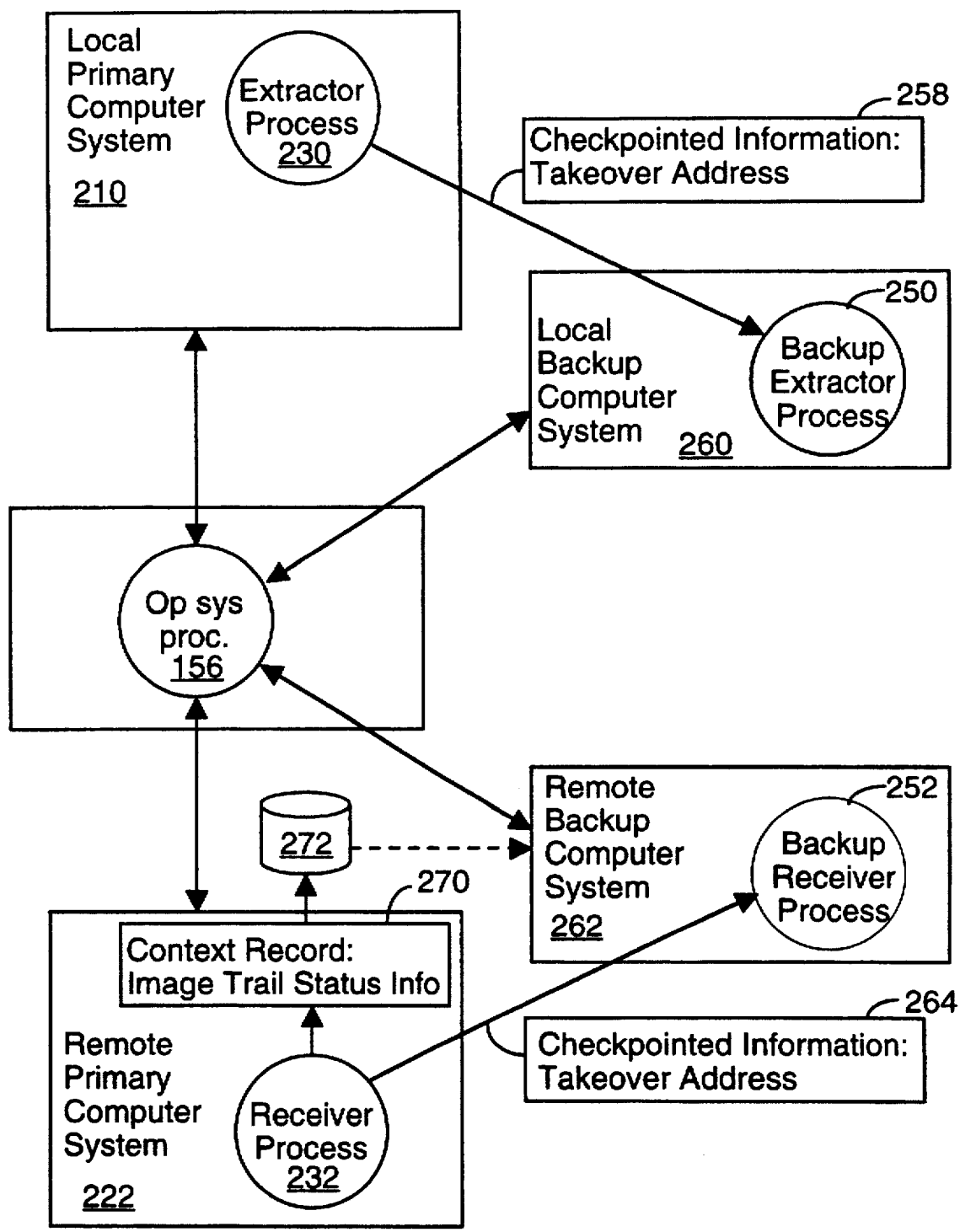
FIG. 4 is a conceptual representation of the checkpoint, context save, and failover procedures used by the system shown in FIG. 3.

FIGS. 3 and 4 represent the basic architecture of a computer system 200 utilizing the remote duplicate database facility (RDF) 220 of the present invention. Operation of the present invention will be explained by first giving an overview of how the present invent ion differs from the prior art Tandem RDF system discussed in the background section of this document. The overview is then followed by a detailed explanation of the extractor, receiver and updater processes of the present invention, and their failover procedures.

Overview of Improved RDF System

Figure 1:
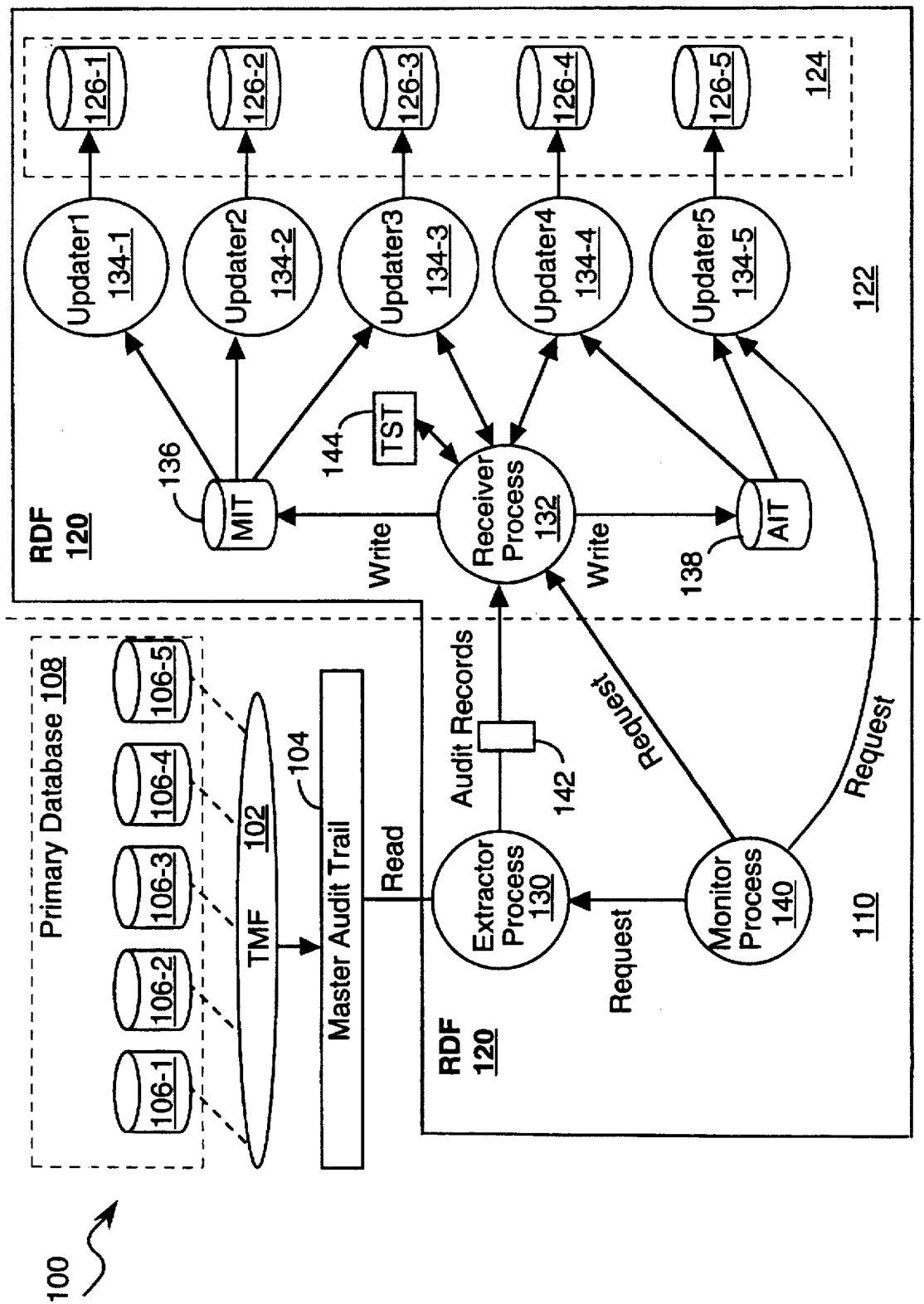
FIG. 1 is a block diagram of a prior art database management system with a remote duplicate database facility.
Figure 2:
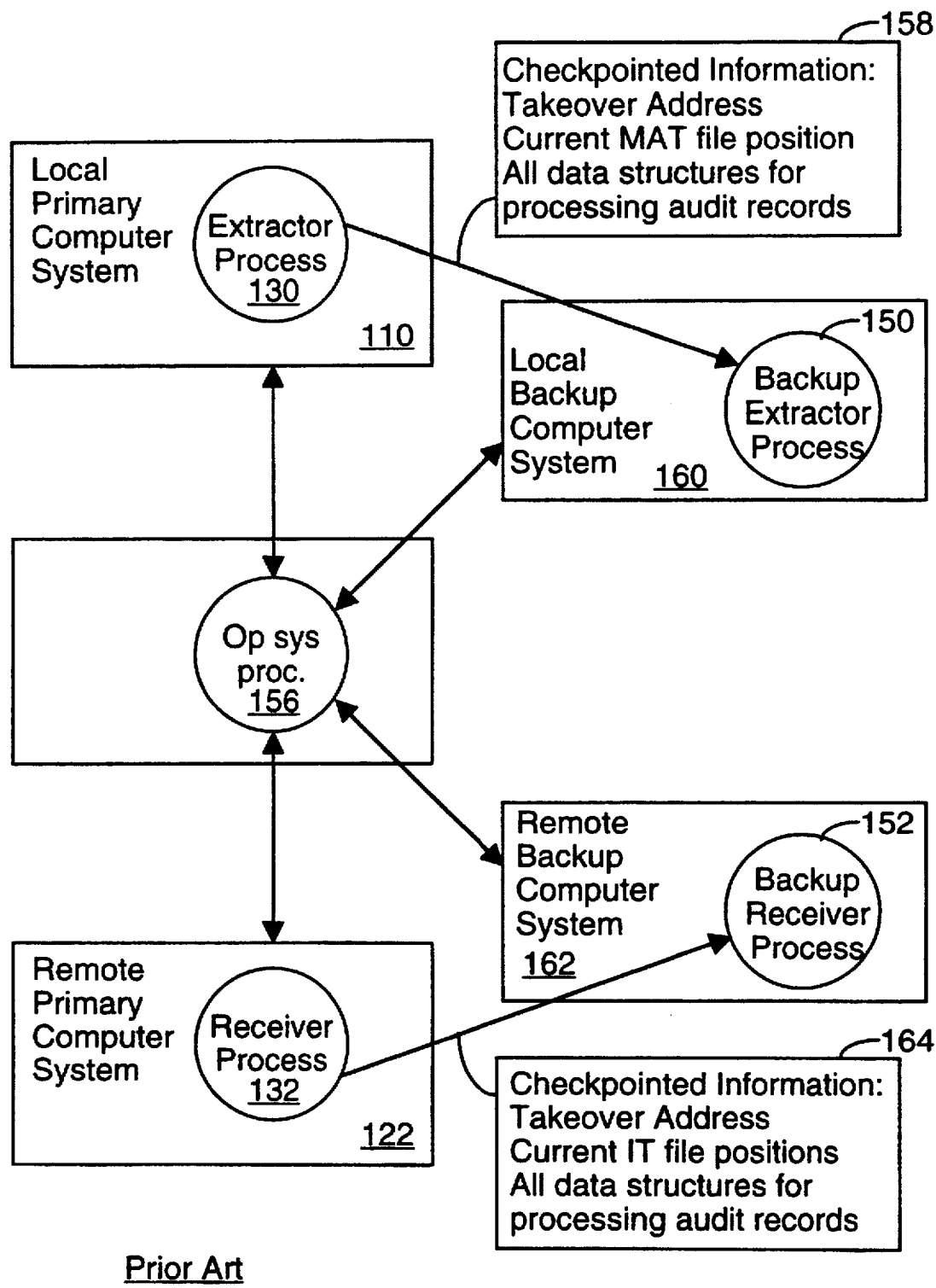
FIG. 2 is a conceptual representation of the checkpoint and failover procedures used by the system shown in FIG. 1.

The extractor-receiver-updater architecture of the RDF system 220 (shown in FIG. 3) has many similarities to the RDF system 120 of FIGS. 1 and 2. Furthermore, the operation of the transaction management massively parallel system (TM/MP) 202 is similar to that of the TMF 102, although most of the changes are not directly relevant to the present invention, with the exception of a new type of audit record stored in the MAT 204 when an "online DDL" operation is performed.

The extractor process 230 of the present invention differs from the prior art version as follows. First, the extractor process 230 of the present invention does not perform frequent checkpoint operations. In fact, the extractor process performs only a single checkpoint operation during startup of the extractor process, and that checkpoint 258 only sends a takeover location to the backup extractor process 250. (See FIG. 4.) After that, the extractor process 230 performs no further checkpoints. It also does not durably store a context record. Rather, the extractor process 230 has been revised so that the extractor relies on information received from the receiver process 232 when recovering from a failover, as will be explained in more detail below, as well as during an RDF startup.

The second most significant change to the extractor process is that it now uses a plurality of message buffers 242. The extractor process 230 now uses two to eight message buffers 242, with four message buffers being a typical configuration. After filling and transmitting a message buffer 242 to the receiver process via a communication channel 244, the extractor process 230 does not wait for an acknowledgment reply message from the receiver process 232. Rather, as long as another message buffer is available, it continues processing audit records in the MAT 204, storing audit image records in the next available message buffer 242. Each message buffer 242 is made unavailable after it is transmitted to the receiver process 232 until a corresponding acknowledgment reply message is received from the receiver process 232, at which point the message buffer 242 becomes available for use by the extractor process 230.

These two changes (i.e., almost complete elimination of checkpointing and use of multiple message buffers) to the extractor process 230 greatly increase its efficiency, the first by almost eliminating resource usage for failover protection, and the second by allowing the extractor process 230 to continue processing audit records in the MAT 204 while waiting for the receiver process to acknowledge receipt of previously sent audit records.

The receiver process 232 of the present invention differs from the prior art version as follows. First, the receiver process 232 of the present invention does not perform frequent checkpoint operations. In fact, the receiver process performs only a single checkpoint operation during startup of the receiver process, and that checkpoint 264 only sends a takeover location to the backup receiver process 252. (See FIG. 4.) After that, the receiver process 232 performs no further checkpoints. However, it does periodically (e.g., once every 5 to 25 seconds) durably store a receiver context record 270 on a nonvolatile (disk) storage device 272. The context record 270 stored by the receiver process 232 is quite small, consisting primarily of two location values per auxiliary image trail 238 and four location values for the master image trail 236.

Compared with the checkpointing performed by the above described prior art receiver process 232, which was typically performed multiple times per second during normal usage and involved the storage of large quantities of information (up to 30 K bytes of data), the periodic context record save operations by the receiver process 232 in the present invention use significantly less resources.

The second significant change to the receiver process is that the receiver process immediately acknowledges each received message buffer. No processing of the message buffer is performed before the acknowledgment is sent. The elimination of message buffer checkpointing by the receiver, and the use of multiple message buffers by the extractor, makes both the receiver and extractor more efficient because idle time in both processes is greatly reduced. Throughput of records from extractor to receiver has improved by approximately a factor of ten (from approximately 110 K bytes/sec to approximately 1300 K bytes/sec on hardware configurations in use in 1996).

A third significant change to the receiver process is that it now sorts received audit records such that (A) commit/abort records are stored only in the master image trail 236, and (B) each database update audit record is moved into only the one image trail 236, 238 corresponding to the only updater process 234 that will potentially use that audit record to update data stored on a backup volume 126. Furthermore, there is no limit on the number of image trails used, while there was a limit of seven image trails in the prior art RDF system due to checkpointing limitations. These changes significantly reduce the I/O burden on the receiver process 232. In a system with N image trails 236, 238, the number of audit records written to disk files is reduced by a factor of N in comparison with the prior art receiver process. This change also makes the updater processes 234 much more efficient than the prior art updater processes 134 because the number of audit records read (by their corresponding disk processes) is also reduced on average by a factor of N.

A fourth significant change to the receiver process is that the receiver process now includes a separate "double buffer" for each image trail. In the preferred embodiment, each image trail has two 56 K byte buffers that are used in alternating fashion. Each image trail buffer 274 is structured as thirteen blocks of length 4 K bytes, plus an overflow area and each image trail buffer is considered to be full when the first 52 K bytes of the buffer have been filled with audit records.

A fifth change to the receiver process is that whenever the contents of the master image trail buffer (primarily commit/abort records) are flushed to durable storage (i.e., written to a master image trail file), all the image trail buffers are also flushed to durable storage in their respective image trail files. As a result, it is guaranteed that for every commit/abort record durably stored in the master image trial, all the associated update audit records are also durably stored in their respective image trails.

A sixth change to the receiver process is that the restart write position in the master image trail file is maintained continuously rather than periodically. Each time a master image trail buffer is written to the master image trail, the receiver process stores in its context record a safeMATposition indicating the MAT position of the last commit/abort record durably stored in the master image trail file. Further, the receiver process returns the status of a transaction when requested by an updater process only after the safeMATposition equals or exceeds the MAT position of the requested transaction.

These fifth and sixth changes ensure that in the event of a failure that affects the receiver process, the updater processes will not apply an update until they have collectively "received" (i.e., in durable storage) all the update audit records for a particular transaction.

In an alternate embodiment, a seventh change to the receiver process is to transfer some of the functions performed by the receiver process to a new responder process. The receiver process will receive the message buffers of audit records from the extractor process and distribute them to the respective image trail buffers. The responder process maintains the transaction status table and handles requests by the updater processes. The transaction status table is updated by the responder process using commit/abort records read from the master image trail file. In the case of a failure, the transaction status table is rebuilt with those records in the master image trail file whose MAT position is less than the safeMATposition. By proceeding in the above manner, all the commit/abort records on which the updaters rely will remain in the same location in the master image file as before the failure.

An eighth change to the receiver process is for the receiver process to ensure that the end of file positions in the image trail files are restored in the case of a failure. When an image trail file is not closed properly, it is possible that the disk process will not update the end of file position. This will cause data written to the image trail files to be inaccessible because the end of file positions do not reflect the latest writes to those files. In order to maintain database integrity, when a failure occurs that affects the closure of the image trail files, the receiver process rereads each image trail file and corrects the end of file position.

Unlike the prior art RDF system, which had virtually no synchronization of extractor and receiver processes, the present invention provides tight synchronization of the extractor and receiver processes and provides for automatic resynchronization whenever either process is started or has a failover, and whenever the receiver process receives audit records out of order from the extractor process.

A change to the updater processes is that whenever the updater process sends a request to the receiver process, it reports to the receiver process the saved image trail file position in the updater's last durably stored context record. The image trail file position is used by the receiver process to determine which image trail files have been processed by all the updaters assigned thereto and thus can be deleted (as was also the case in the prior art RDF system).

Detailed Explanation of Extractor Process

Figure 5A:
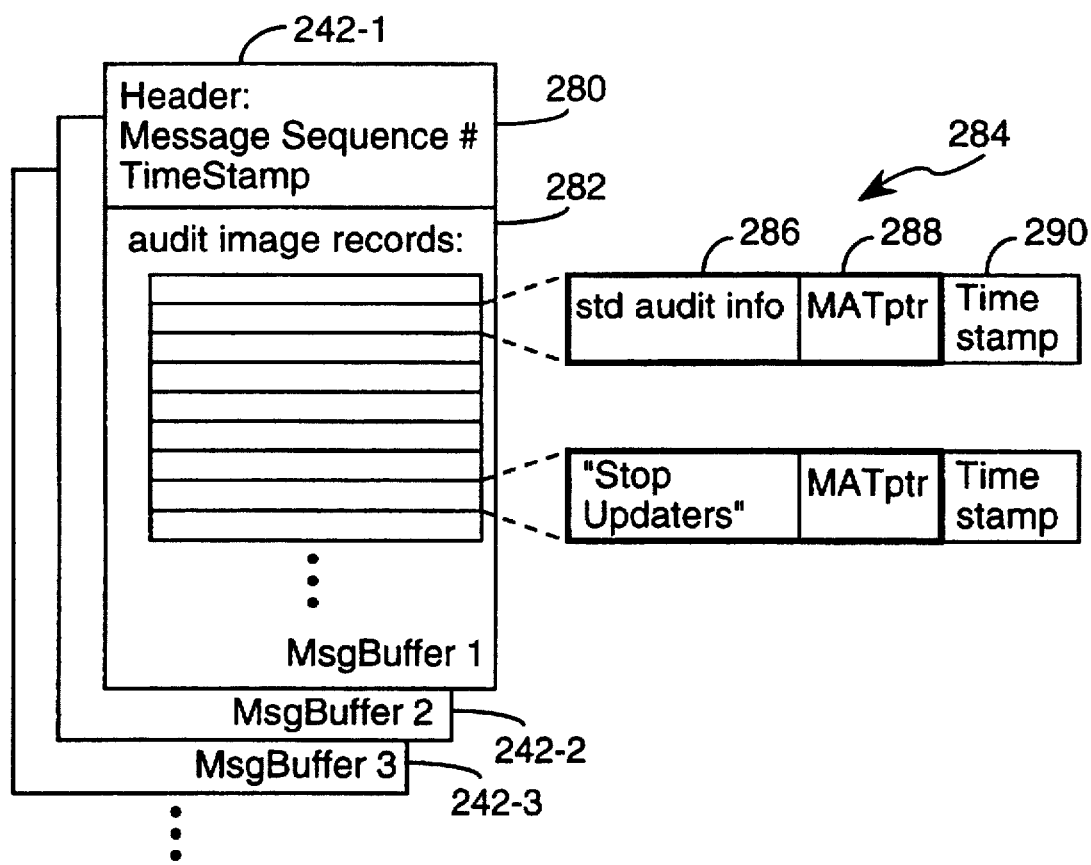
FIGS. 5A and 5B depict data structures used by the extractor process in a preferred embodiment of the present invention.
Figure 5B:
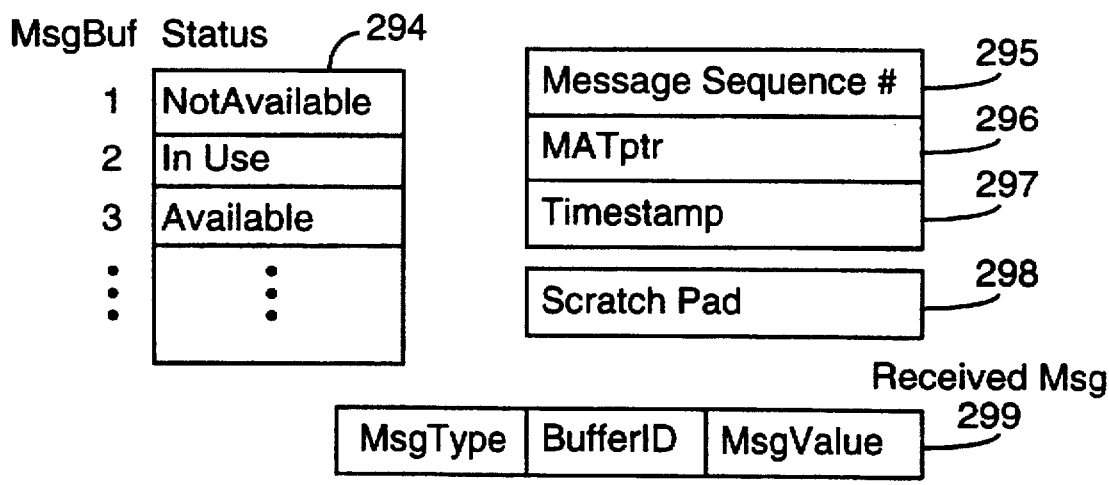

Referring to FIGS. 5A and 5B, the primary data structures used by the extractor process 230 are as follows. As stated earlier, the extractor process 230 utilizes two or more message buffers 242. A portion of each message buffer 242 is used to store a "header" 280, which includes (A) a message sequence number and (B) a timestamp. The body 282 of the message buffer 242 is used to store audit image records 284. Each image record 284 includes an audit information portion 286, a MAT position value 288 and a timestamp value 290. The audit information portion 286 and the field occupied by the MAT value 288 are copied from an audit record in the MAT 204, while the timestamp field 290 is appended by the extractor process to create an "audit image record" 284.

The audit information portion 286 consists of the standard information found in audit records in the MAT 204, such as before and after field values for a modified row in a database table, or a commit/abort indication for a completed transaction. In accordance with the present invention, a new audit image record is defined in which the audit information portion 286 contains a "Stop Updaters" value, indicating that each updater process 234 should be stopped when it reads that audit record.

The extractor process 230 also maintains a message buffer status table 294, which indicates for each message buffer whether that buffer is available for use, not available for use, or is currently in use by the extractor. In addition, the extractor process 230 maintains a message sequence number in register 295, a MAT file pointer in register 296, a local timestamp value in register 297, and a scratch pad 298 in which it stores audit image records that it is currently processing.

Finally, the extractor process 230 includes a data structure 299 for storing reply messages received from the receiver process 232. This data structure includes a first field indicating the type of message received, which is equal to either "message buffer acknowledgment" or "resynch reply", a message buffer identifier, and a "message value" field. The message value field is equal to a MAT position value when the message type is "resynch reply," and is equal to either an "OK" or "Error" condition code when the message type is "message buffer acknowledgment."

Figure 6A:
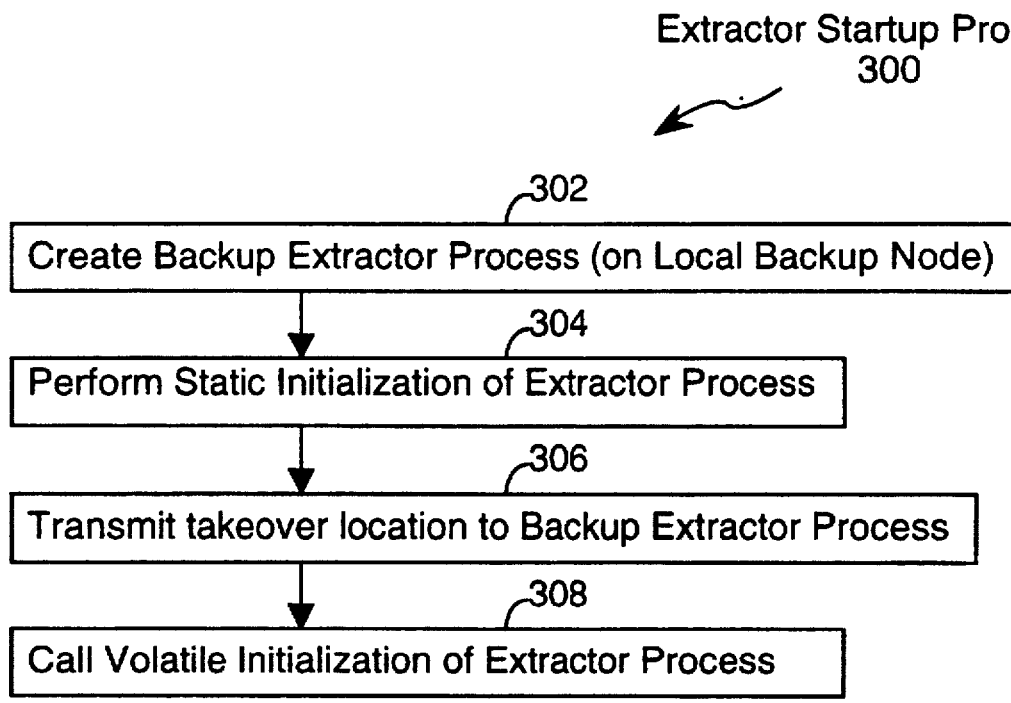
FIGS. 6A-6E are flowcharts of procedures executed by the extractor process in a preferred embodiment of the present invention.
Figure 6B:
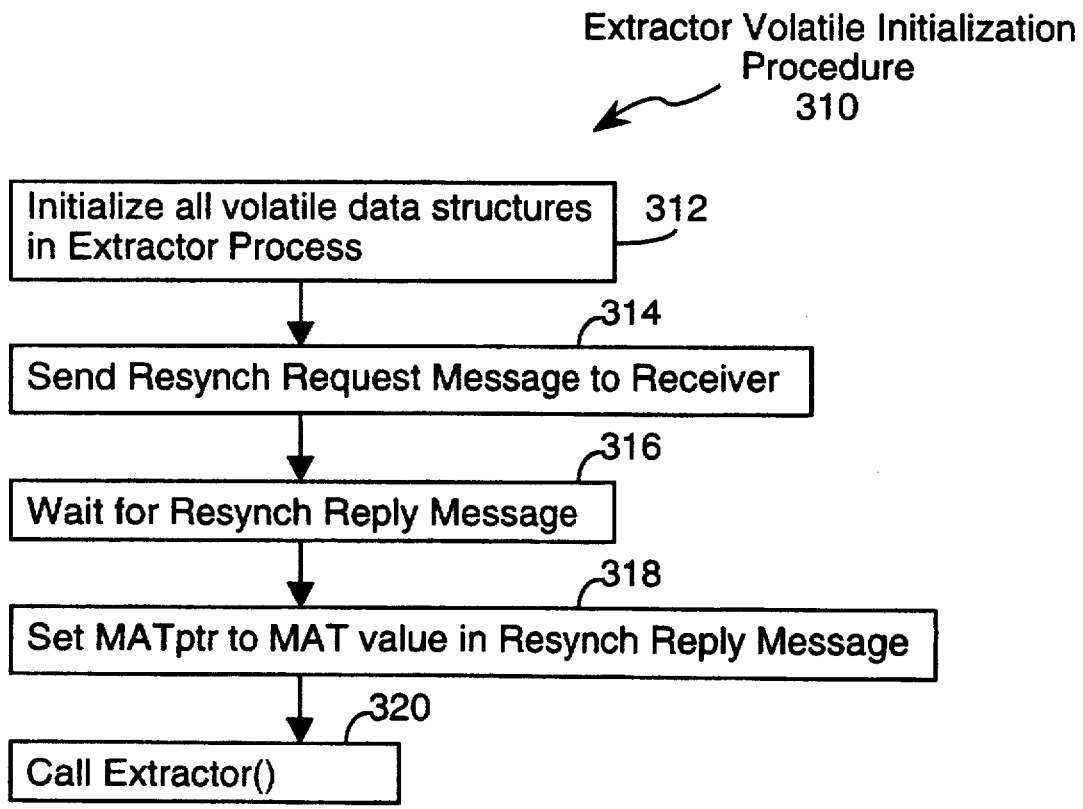
Figure 6C:
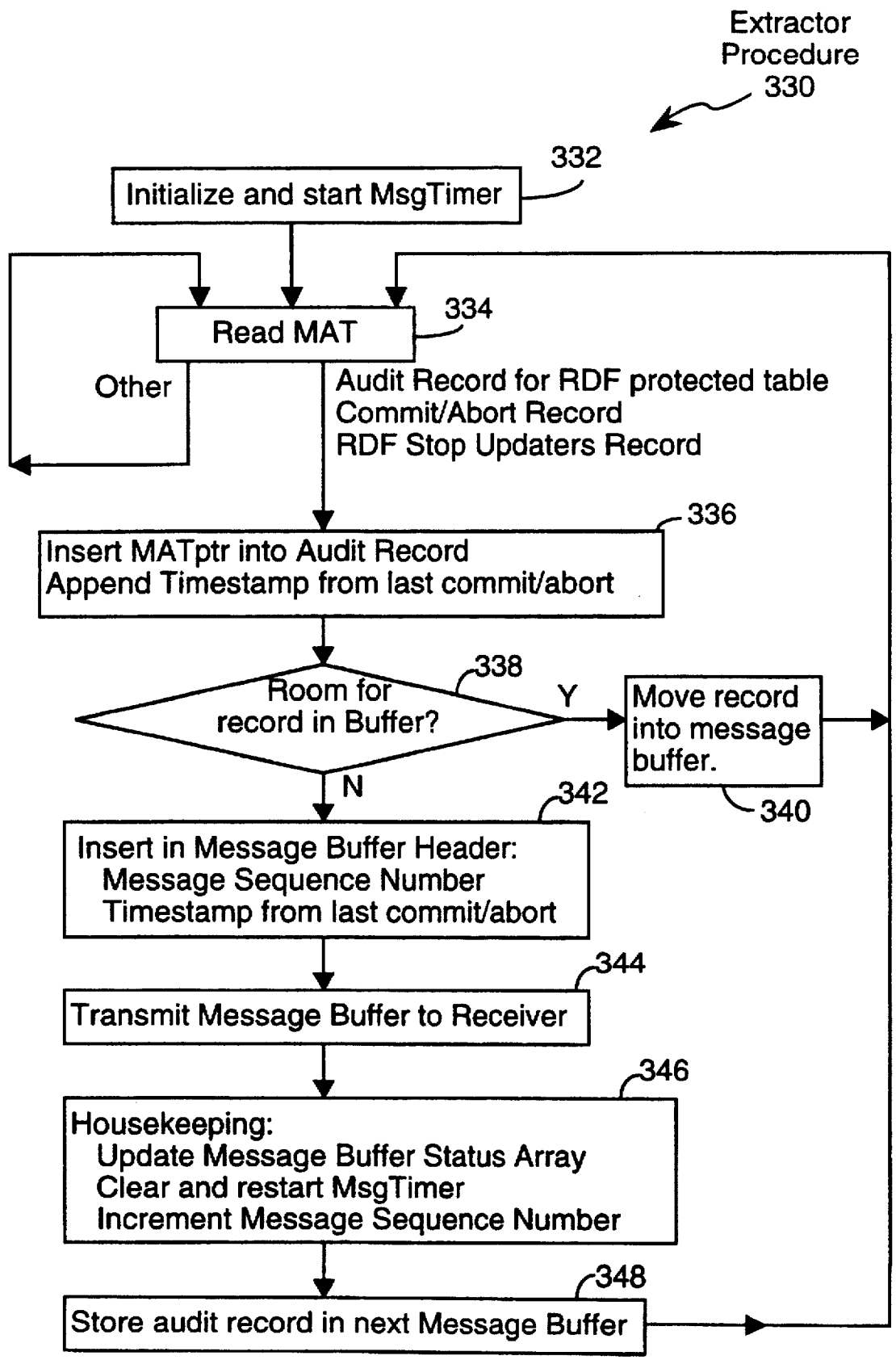

Appendix 1 lists a pseudocode representation of the procedures executed by the extractor process 230. Appendix 2 lists a pseudocode representation of the procedures executed by the receiver process 232. Appendix 3 lists a pseudocode representation of the procedures executed by the updater processes 234. Appendix 4 lists a pseudocode representation of the procedures executed by an alternate embodiment of the receiver process 232. Appendix 5 lists a pseudocode representation of the procedures executed by a responder process 231 in an alternate embodiment of the present invention. Appendix 6 lists a pseudocode representation of the procedures executed by each updater process 134 in an alternate embodiment of the present invention. The pseudocode used in Appendices 1–6 is, essentially, a computer language using universal computer language conventions. While the pseudocode employed here has been invented solely for the purposes of this description, it is designed to be easily understandable by any computer programmer skilled in the art. Referring to FIGS. 6A-3E, and the pseudocode in Appendix 1, the extractor process 230 works as follows.

The Extractor Startup Procedure 300 is called whenever the extractor process 230 or its backup starts up, as in the case of a failover or a transfer of control back to the primary extractor process 230 from the backup extractor process. The Startup procedure begins by creating a backup process (302). The startup procedure then performs a "static initialization" of the extractor process (304), which means that all static data structures used by the extractor process are allocated and initialized. While initializing static data structures, the extractor process reads information denoting the set of RDF protected objects from a disk file having a predefined filename and disk location, and builds an internal table of RDF protected disk volumes. This table is used later as a audit record filter, such that object update audit records for non-RDF protected volumes are ignored by the extractor process. Then a checkpoint operation is performed in which a takeover location is transmitted to the backup extractor process (306). The takeover location is, in essence a program address, and in the preferred embodiment the takeover location is the program location at which execution of the volatile initialization procedure 310 begins. Finally, the Extractor Startup procedure calls (308) the Extractor Volatile Initialization procedure 310.

The Extractor Volatile Initialization procedure 310 is called during startup by the Extractor Startup procedure 300 and when the extractor receives an Error reply message in response to a message buffer. The Extractor Volatile Initialization procedure begins by allocating and initializing all volatile data structures used by the Extractor process, including message buffers 242, the message buffer status array 295 (312), and the message sequence number (which gets initialized to an initial value such as 1). Then the Extractor Volatile Initialization procedure transmits a Resynchronization Request message to the receiver process (314) and waits for a Resynch Reply message (316). The Resynch Reply message will contain a MAT position value, which the Extractor Volatile Initialization procedure moves (318) into the MAT position pointer MATptr 296. Finally, the Extractor Volatile Initialization procedure calls (320) the main Extractor procedure 330.

The Main Extractor procedure 330 begins by initializing and starting a timer called the Message Timer (MsgTimer) (332). The Message Timer is typically programmed to expire in 1 or 2 seconds, although the timeout period is configurable to virtually any value. Next, the extractor procedure reads a record in the MAT (334). If the MAT record is an audit record for an RDF protected object, is a commit/abort record for any transaction, or is a "Stop Updaters" record, the audit record is modified by inserting the MAT position of the current audit record into the audit record and by appending to the audit record a timestamp (336). The appended timestamp is the timestamp of the last transaction to complete prior to generation of the audit record in the MAT 204. Every time the extractor procedure encounters a commit or abort audit record, it moves a copy of the timestamp in that record into its local timestamp register 297. The value in the local timestamp register 297 is the timestamp that is appended to audit records so as to generate an audit image record, also known as an image record.

If the message buffer currently in use has room for the resulting audit image record (338) it is moved into the message buffer (340). Then the Extractor procedure continues processing the next record in the MAT at step 334.

If the message buffer currently in use is full (338), the values stored in the message sequence number register 295 and the timestamp register 297 are inserted into the Message Buffer's header 280 (342). The extractor procedure then transmits the message buffer to the receiver process (344). After transmitting the message buffer, the Message Buffer Status array 294 is updated to indicate that the message buffer just transmitted is not available for use. In addition, the Message Timer is cleared and restarted, and the Message Sequence Number in register 295 is increased by one (346). Finally, the audit image record that did not fit in the last message buffer is moved into a next message buffer (348). If a next message buffer is not available, the extractor procedure waits until one becomes available and then moves the audit image record into it. Then the Extractor procedure continues processing the next record in the MAT at step 334.

When the audit record read (334) from the MAT 204 is not an audit record for an RDF protected table, is not a transaction commit/abort record and is not a "Stop Updaters" record, the audit record is ignored and the next audit record (if any) in the MAT is read (334).

Figure 6D:
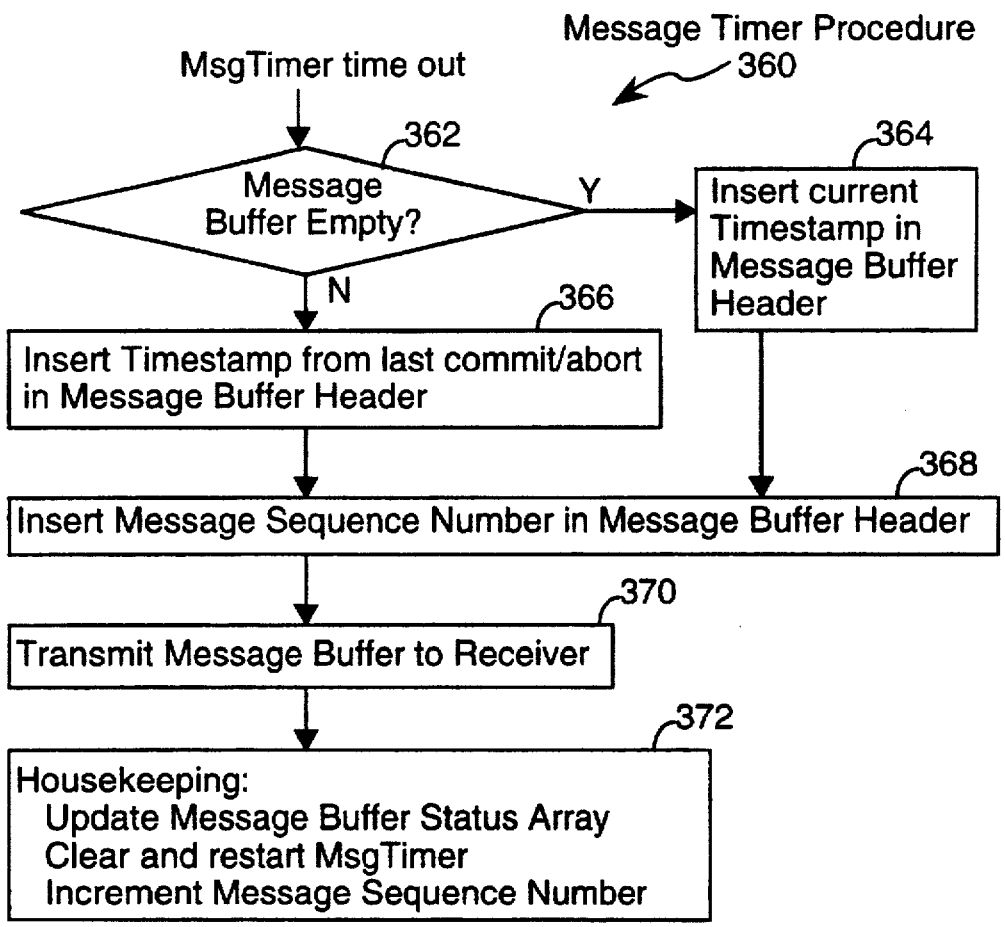
Figure 6E:
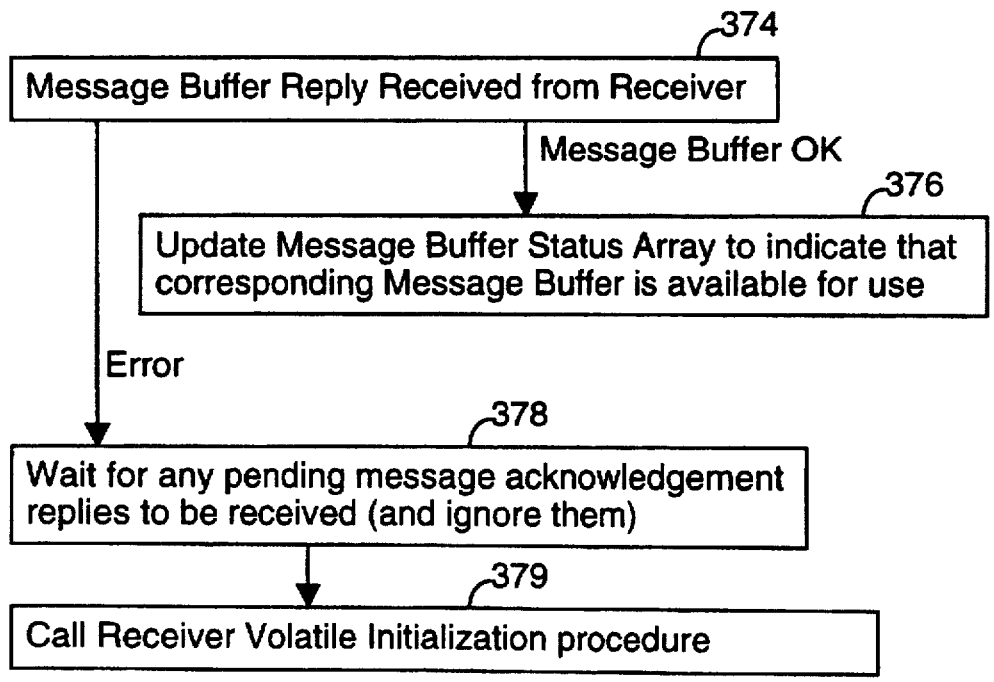

The purpose of the Message Timer is to ensure that audit image records are transmitted to the receiver process in a timely fashion, even when the rate at which audit records are generated for RDF protected files is low. Referring to FIG. 6D, when the Message Timer times out the Message Timer procedure 360 first checks to see if the current Message Buffer is empty (i.e., contains no audit image records) (362).

If so, a current timestamp indicative of the current time is inserted into the Message Buffer header 280 (364). If not, the timestamp value from the last commit/abort record, stored in timestamp register 297, is inserted into the Message Buffer header (366). Then the current Message Sequence Number is inserted in the Message Buffer header (368) and the Message Buffer is transmitted to the receiver (370). After transmitting the message buffer, the Message Buffer Status Array 294 is updated to indicate that the message buffer just transmitted in not available for use, the Message Timer is cleared and restarted, and the Message Sequence Number in register 295 is increased by one (372).

When the extractor process receives a reply from the receiver process acknowledging receipt of a message buffer (374), if the reply message indicates the message buffer was received without error, the Message Buffer Status Array 294 is updated to indicate that the message buffer identified in the reply message in available for use (376).

If the reply message received by the extractor process from the receiver process has a message value indicating an error condition, the receiver process is requesting that the extractor and receiver resynchronize. The receiver process sends an error condition reply message whenever (A) a message with an out-of-sequence Message Sequence Number is received, and (B) whenever the receiver process starts up after a failover or return of control back to the primary receiver process from the backup receiver process (sometimes called a CheckSwitch). When the extractor process receives an error condition reply message from the receiver process, it waits for any pending message acknowledgment replies to be received for any other message buffers transmitted prior to receipt of the error condition reply message, and it ignores those reply messages (378). Then the extractor process calls the Extractor Volatile Initialization procedure (379) so as to resynchronize the extractor process with the receiver process.

Detailed Description of Receiver Process

The primary data structures used by the receiver process 232 in the preferred embodiment are shown in FIGS. 7A–7D. As stated earlier, the receiver process durably stores a context record 270 on a nonvolatile (disk) storage device 272 on a periodic basis (e.g., once every 5 to 25 seconds). As shown in FIG. 7A the context record includes two location values per auxiliary image trail 238, four location values for the master image trail 236 (including a safeMATposition 390 and a TST/MIT restart position 395) and a Receiver.StopUpdatersCnt count value 391.

As explained earlier, every audit record shipped to the receiver process 232 has a MAT position value inserted in it by the extractor process. When the receiver process moves audit image records into the image trail buffer 274 for an image trail, the MAT position of the last such record is stored in the appropriate slot of the context record 270.

??>> Also, the receiver process 232 creates an image trail for each updater process. A timestamp indicating the time at which the image trail is created is stored in the appropriate slot of the context record 270.

Each image trail buffer 274 consists of thirteen blocks of data, where the size of each block spans 4 K bytes, and a 4 K byte overflow storage area. Each block contains a block header 394 containing an image trail timestamp 393 indicating when the image trail was created. This timestamp is used to differentiate between the various blocks of data in an image trail when the receiver process restores the EOF position, which is described in more detail below. As stated earlier, two image trail buffers 274 are used for each image trail, and these are used in alternating fashion.

Furthermore, each image trail buffer 274 is written to the corresponding disk file only (A) when the image trail buffer 274 is full (i.e., contains 28 K of data); (B) before the receiver process writes the master image trail buffer to the master image trail file, all the auxiliary image trail buffers are written to disk using waited writes; or (C) when the receiver performs a periodic flush operation. In this situation, the image trail buffer 274 containing the associated audit records is flushed to the associated image trail file. ??>> Each time data from any image trail buffer 274 is written to disk, the disk file location for the next write to the image trail file (i.e., the disk address for the current end of the image trail file) is stored in the appropriate slot of the context record 270.

The safeMATposition 390 in the context record is derived from the last written commit/abort record written to the master image trail file and will be described below.

The Receiver.StopUpdatersCnt 391 is a count value that is incremented each time the receiver encounters and Stop Updaters record in a received message buffer whose MAT value is higher than the MAT position for at least one image trail.

The image trail buffer status array 392 stores one pointer value for each image trail. That pointer value is the buffer location for the next audit record to be written to the image trail buffer 274, and is updated every time an audit record is written to the image trail buffer to point to the next available position for an audit record in that buffer. Whenever the buffer pointer value reaches a 4 K byte boundary, certain information (described below) is written into the next block header 394 in the image trail buffer 274.

The receiver process also stores a "Next Message Sequence Number" 396, a "restart MAT position" 398, and an "ExpectStopUpdate" flag 399. The Next Message Sequence Number 396 is the message sequence number the receiver expects to see in the next message buffer receiver and is normally incremented by one after each message buffer is received. The restart MAT position 398 is the lowest of the MAT position values stored in the context record 270. The ExpectStopUpdate flag 399 is a flag set in response to a special "Expect Stop Update" message from the Monitor process just prior to a StopUpdaters audit record being moved by the extractor process into its current message buffer.

Referring to FIG. 7C, the updater status table 400 maintained by the receiver process stores the following information for each updater process: a value 402 that identifies the associated image trail, the LimitPosition 404 currently assigned to the updater, the last MIT position 406 reported by the updater process to the receiver process, and the last image trail file position 408 reported by the updater process to the receiver process. The meaning of these fields will be explained below.

Referring to FIG. 7D, the transaction status table 144 maintained by the receiver process includes for each commit/abort record processed in the master image trail 236 a transaction ID 410, a status value 412 (i.e., commit or abort), the MIT position of the commit/abort record 413, and the MAT position of the commit/abort record 413. The receiver also maintains an MIT position value 414 representing the last record in the MIT processed by the receiver process for purposes of updating the transaction status table 144.

Referring to FIGS. 8A–8H, and the pseudocode in Appendix 2, the receiver process 232 works as follows.

Figure 8A:
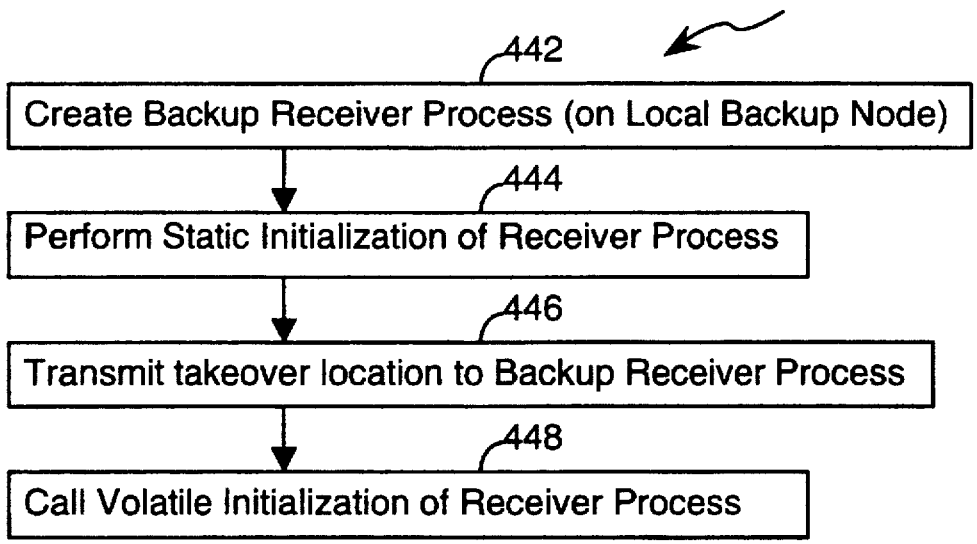
FIGS. 8A-8H flowcharts of procedures executed by the receiver process in a preferred embodiment of the present invention.

Referring to FIG. 8A, the Receiver Startup Procedure 440 is called whenever the receiver process 232 or its backup is started, as in the case of a failover or a transfer of control back to the primary receiver process 232 from the backup receiver process. The Startup procedure begins by creating a backup process (442). The startup procedure then performs a "static initialization" of the receiver process (444), which means that all static data structures used by the receiver process are allocated and initialized. Then a checkpoint operation is performed in which a takeover location is transmitted to the backup receiver process (446). The takeover location is, in essence a program address, and in the preferred embodiment the takeover location is the program location at which execution of the Receiver Volatile Initialization procedure 450 begins. Finally, the Receiver Startup procedure calls (448) the Receiver Volatile Initialization procedure 450.

Figure 8B:
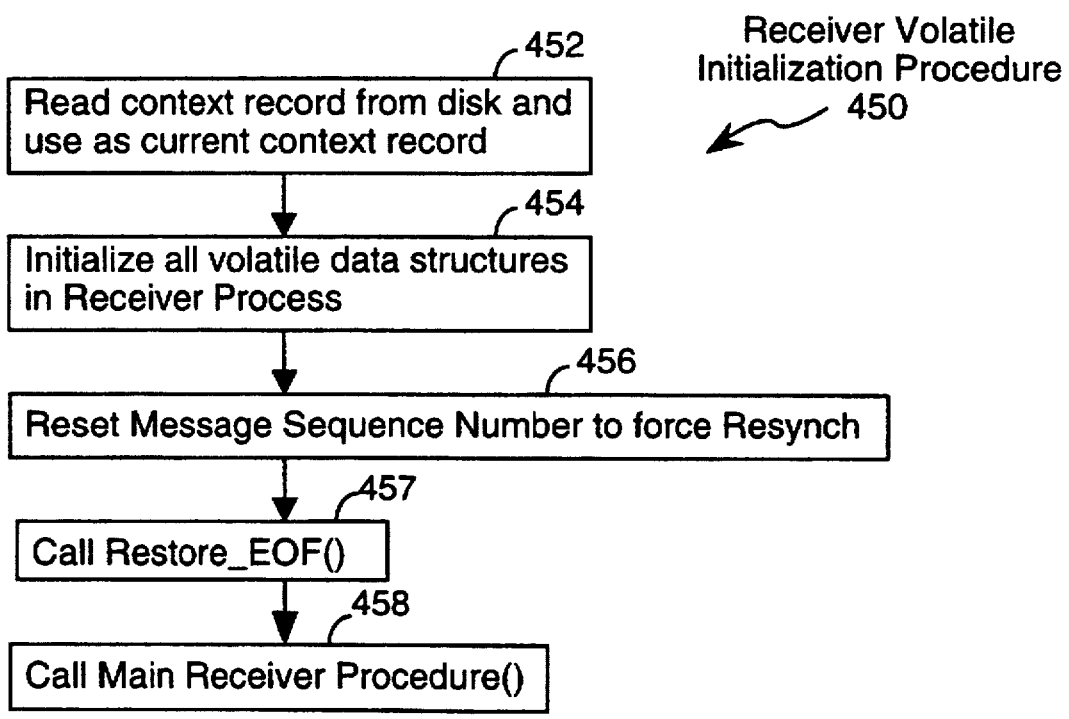
Figure 8C:
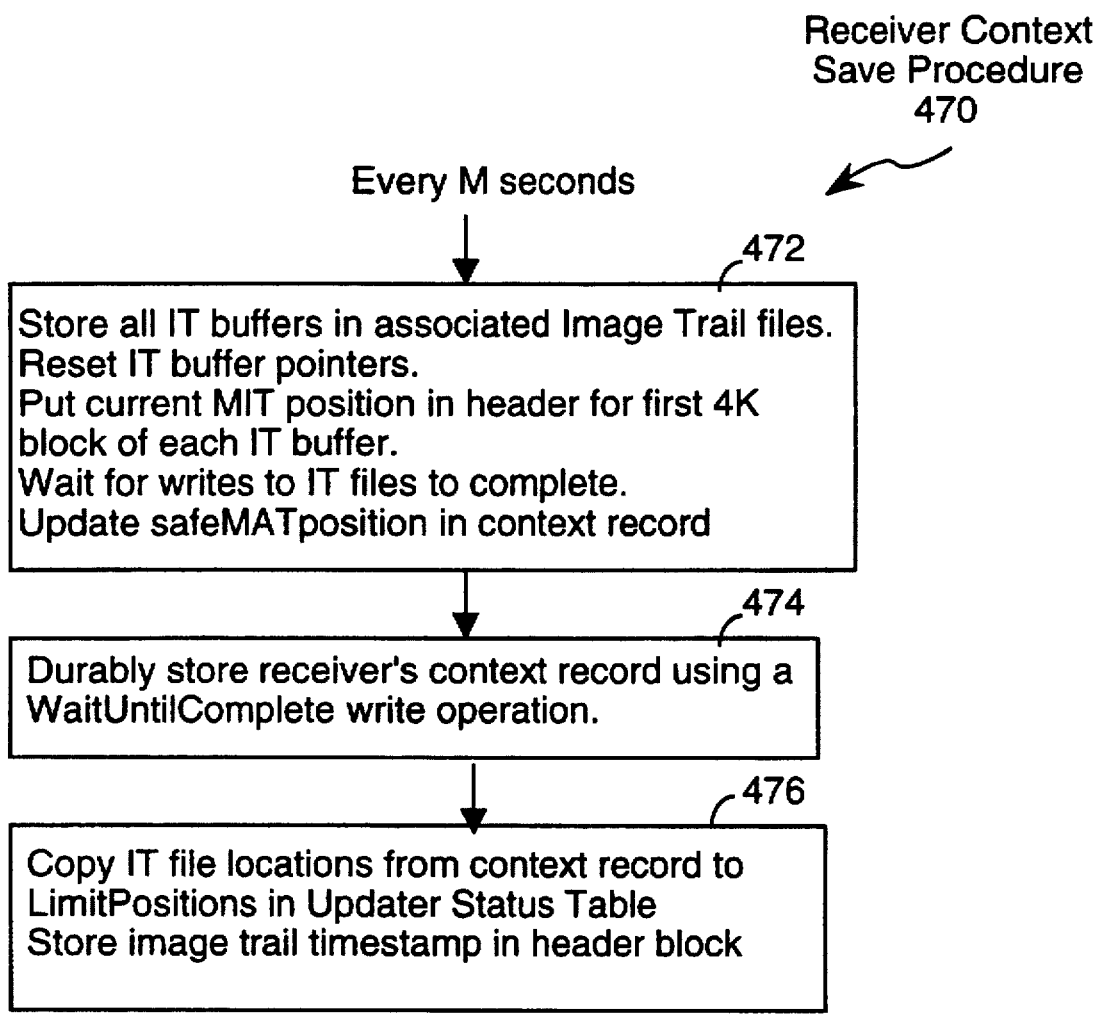
Figure 8D:
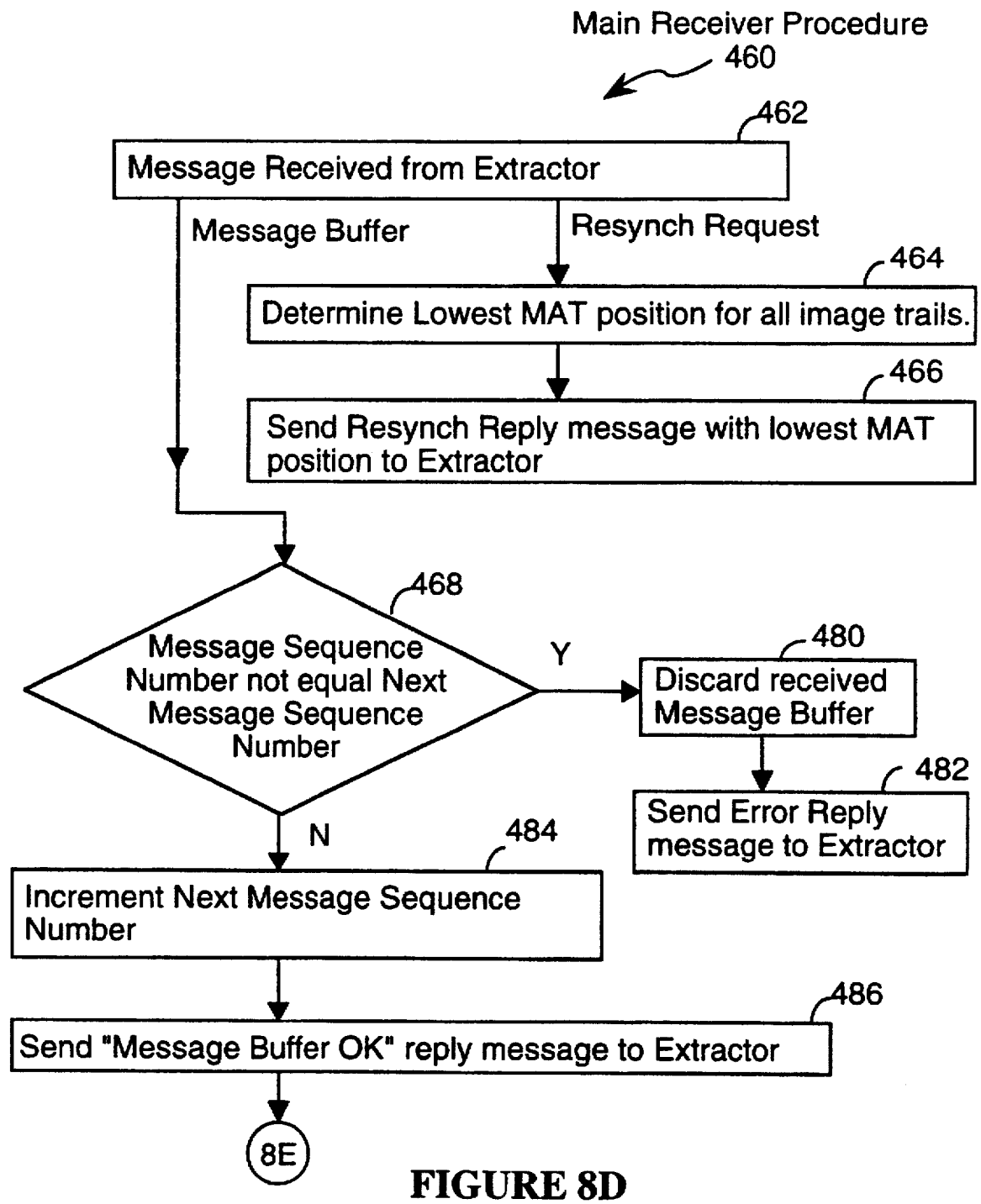
Figure 8E:
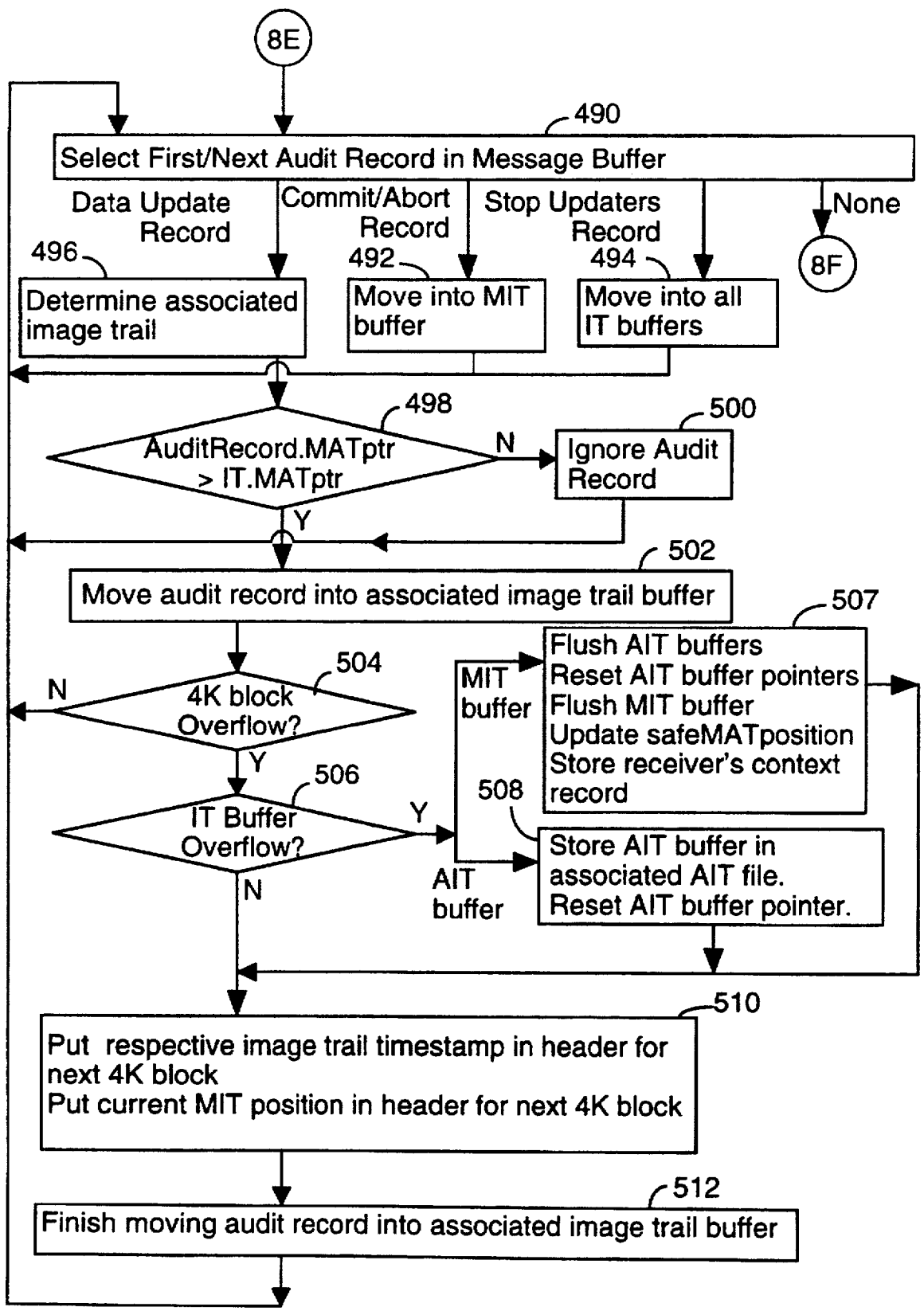
Figure 8F:
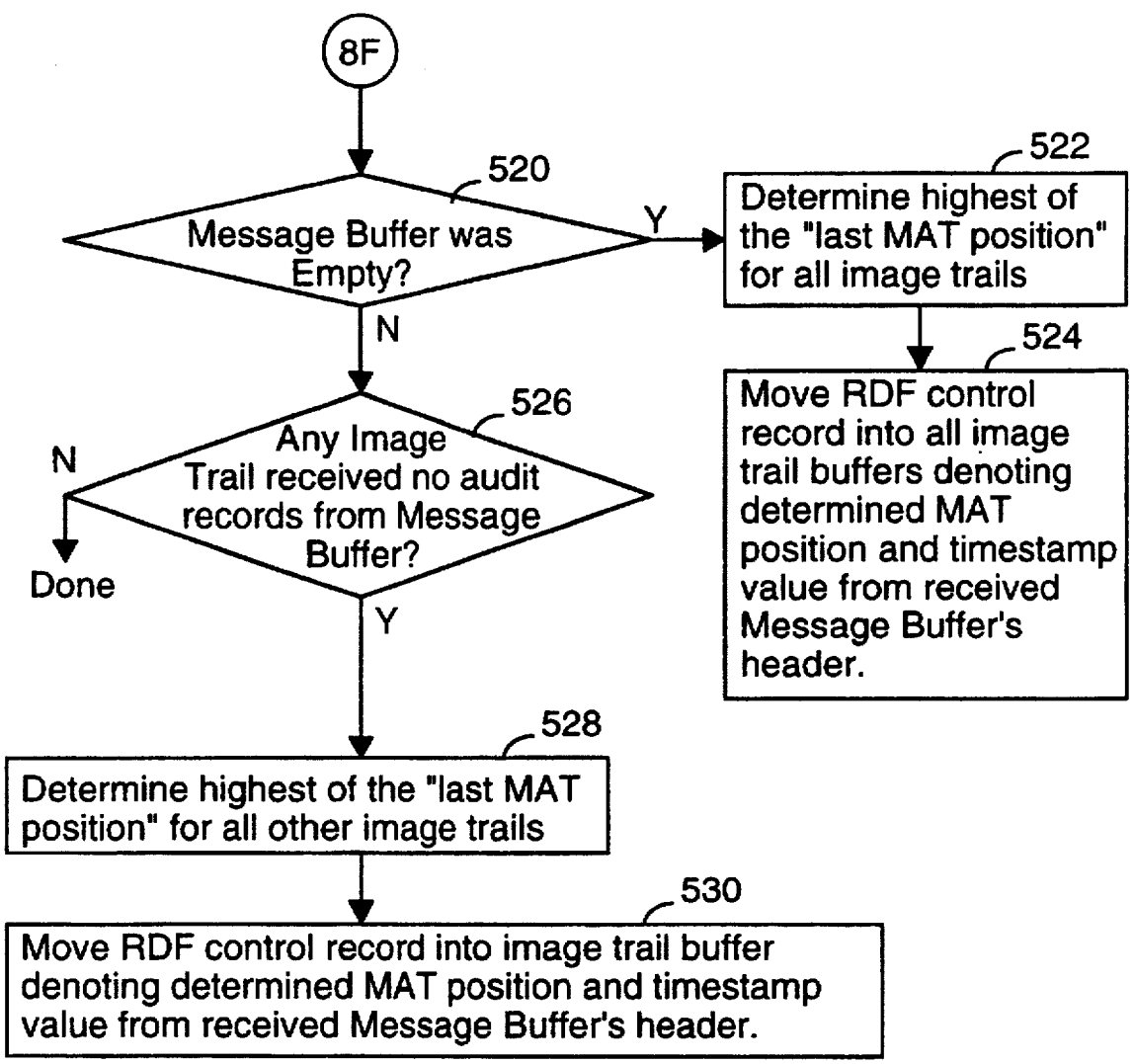

Referring to FIG. 8B, the Receiver Volatile Initialization procedure 450 is called during startup by the Receiver Startup procedure 440. The Receiver Volatile Initialization procedure 450 begins by reading the last stored Receiver context record from disk and using it as the receivers current context record in volatile memory (452). Then the Receiver Volatile Initialization procedure allocates and initializes all volatile data structures (454) used by the Receiver process, including the image trail buffers 274, the image trail buffer status array 392, the updater status array 400 and the transaction status table 144. Then the Receiver Volatile Initialization procedure sets the receivers Expected Message Sequence Number to "1" (456). This will force the receiver and extractor to resynchronize, unless the extractor is starting up at the same time such as in response to a "Start RDF" command. Next, the receiver process calls (457) the Restore_EOF procedure to restore the end of file (EOF) positions for each of the image trails. Finally, the Volatile Initialization procedure calls (458) the Main Receiver procedure 460.

Referring to FIGS. 8C–8F, the Main Receiver procedure 460 includes a subprocedure 470 for periodically saving the receivers context record. This subprocedure is called every M seconds, where M is preferably a value between 5 and 25 and is typically set to 5. The first step (472) of the context save procedure durably stores the contents of each image trail buffer to its associated image trail file and resets all image trail buffer pointers (in IT buffer status table 392) to point to the beginning of the appropriate image trail buffer 274. The subprocedure also copies the current MIT end of file position from the context record into the first block header 394 in each of the image trail buffers. Then the subprocedure waits for the writes to the image trail files to complete (472). Next, the safeMATposition is updated to reflect the MAT position of the last commit/abort record stored in the master image trail (472).

Once the image trail buffer contents have been written to disk, the receivers context record is durably stored on disk using a WaitUntilComplete write operation (474) (i.e., the step does not complete until the associated disk process sends a completion message back to the receiver process). Next, the image trail file locations in the context record are copied into the LimitPositions in the Updater Status table 400 (476). This step allows the Updaters to process records up through the last audit image record stored on disk prior to the context save operation. Lastly, the image trail timestamp of each image trail file is stored in the first 4K block header of the corresponding buffer (476).

The receiver process 232 is a "passive" process in that it does not initiate messages to other processes. Rather it only responds to messages from the extractor process 230, messages from the updater processes 234, and from the monitor process 240.

When a message is received from the extractor process (462), if the message is a Resynch request message, the receiver determines which of the MAT positions listed in the context record is lowest (464), and sends a Resynch Reply message to the extractor with the determined lowest MAT position embedded in the reply message (466).

If the received extractor message is a message buffer message, the message sequence number (denoted Message.SequenceNumber) in the received message is compared with the locally stored Next Message Sequence Number (468). If the received message sequence number is not equal to the locally stored Next Message Sequence Number, the received message buffer is discarded (480) and an Error Reply message is sent to the extractor (482).

If the received message sequence number is in sequence, the locally stored Next Message Sequence Number is incremented by one (484) and a "Message Buffer OK" reply is sent to the extractor (486). A message buffer identifier is associated with the received message and is also associated with the reply message so that the extractor can properly update its message buffer status table by marking the acknowledged message buffer as available.

Next, all the audit records in the received message buffer are processed in sequence (490). Each commit/abort audit record is moved into the MIT buffer 274-1 (492). Furthermore, the contents of each commit/abort record are used to store a new corresponding transaction status record in the transaction status table 144. Each "Stop Updaters" record is processed as follows. The MAT position (AuditRecord.MATptr) in the Stop Updaters record is compared with the MAT position (IT.MATptr) for each identified image trail (498). If the MAT position of the Stop Updaters records is higher than the MAT position of any image trail (in which case it will be higher than the MAT position for all the image trails) (A) the Stop Updaters records is moved or copied into all the image trail buffers 274 record (494) and (B) the Receiver.StopUpdatersCnt 391 count value in the receiver context record 270 is incremented.

Each data update audit record is processed as follows. First, the image trail associated with the record is determined (by determining the database object updated on the primary system, determining the volume on which that object is stored, determining the updater responsible for replicating RDF protected files on that volume and then determining the image file associated with that updater) (496). Next, the MAT position (AuditRecord.MATptr) in the audit record is compared with the MAT position (IT.MATptr) for the identified image trail (498). If the audit record's MATptr is not larger than the image trail's MATptr, the audit record is ignored (500) because it has already been processed by the receiver.

Otherwise, the audit record is moved into the identified image trail buffer (502). When an audit record is moved to an associated image trail buffer, special processing is required if an overflow of the 4 K byte block occurs within the image trail buffer (504) (see description of steps 510, 512 below). Next the receiver process determines whether moving the audit record into the image trail buffer caused an overflow of the last block in the image trail buffer (506).

If the image trail buffer that overflowed is the master image trail buffer, several operations are performed. First, all image trail buffers are durably stored in the respective image trail file, the receiver's context record is updated to reflect the new end of file position for the image trail, any data in the overflow block is moved up to the beginning of the image trail buffer, and then the buffer pointer for that buffer is reset to point to the next available slot near the beginning of the image trail buffer. Upon I/O completion, the safeMATposition is updated to reflect the MAT position of the last record written to the master image trail. The updated safeMAT position is stored in the receiver's context record. Next, the receiver's context record is durably stored using a waited write operation (507). In addition, step 507 copies the image trail file locations in the receiver context record into the LimitPositions in the Updater Status table 400.

If the image trail buffer that overflowed is the master image trail buffer, the entire image trail buffer through the last 4 K block is durably stored in the associated image trail, the receiver's context record is updated to reflect the new end of file position for the image trail, any data in the overflow block is moved up to the beginning of the image trail buffer, and then the buffer pointer for that buffer is reset to point to the next available slot near the beginning of the image trail buffer (508).

If either a 4 K byte block has been overflowed, or the entire message buffer has overflowed, the respective image trail timestamp is stored in the block header for the next 4 K block of the corresponding image trail buffer (510). Also, the current MIT position (which is the MIT file position associated with the last audit record written to the MIT message buffer) is stored in the header for the next 4 K block in the image trail buffer (510). Then the process of moving the current audit record into the image trail buffer is completed (512) and processing of the next audit record (if any) in the received message buffer begins at step 490.

If the received message buffer was empty (520), the receiver determines the highest of the MAT positions stored in the context record for all the image trails, which is equal to the MAT position of the last audit record received from the extractor in the last message buffer received that contained any audit records. Then an "RDF control record" is moved into all the image trail buffers (524). The RDF control record denotes (A) the determined highest MAT position, and (B) the timestamp value in the received message buffer's header.

If the received message buffer was not empty (520), but if one or more image trails received no audit records from the current message buffer (526), the receiver determines the highest of the MAT positions stored in the context record for all the other image trails (528), which is equal to the MAT position of the last audit record received from the extractor in the current message buffer. Then an "RDF control record" is moved into each image trail buffer that did not receive any audit records (530). The RDF control record denotes (A) the determined highest MAT position, and (B) the timestamp value in the received message buffer's header.

When a message is received from any updater process (540), the message is initially processed by extracting from the updater request message (A) the updater's identifier, (B) the updater's current image trail position, and (C) the last MIT position read by the updater from a block header in the updater's image trail (542). The extracted Image trail position and MIT position are stored in the Updater Status table (544). Using the updated information in the Updater Status table, the Restart MIT position in the receiver's context record is updated to be equal to the lowest MIT position for all the updaters (546). In addition, the receiver process deletes any image trails eligible for deletion based on the updated image trail position values received from the updater (547).

If the received Updater request message is a LimitPosition request message, the receiver reads the current LimitPosition for the updater and sends a reply message with that LimitPosition to the requesting updater (548).

If the received Updater request message is a Transaction Status request message, the receiver extracts from the request message the Transaction identifier for which the updater is requesting a status value (550). Then the transaction status table 144 is inspected to see if the status of that transaction is known (552). If not, the receiver waits until a commit/abort record for the specified transaction is received from the extractor (554). Next, the receiver determines whether the safeMATposition is less than the MAT position of the requested transaction (555). The MAT position of the requested transaction is obtained from the transaction status table 144. When the safeMATposition is less than the MAT position of the requested transaction, the receiver waits until the safeMATposition reaches the MAT position of the requested transaction (555-Y). Otherwise, a reply message is sent to the requesting extractor (556). The reply message includes (A) the current LimitPosition for the updater, and (B) a set of transaction status records, starting with the record for the identified transaction. Preferably a substantial number of transaction records (e.g., 200 records, or all the status records in the TST 144 after the identified record if less than 200) is sent with each reply so as to reduce the number of Transaction Status requests sent by updaters. However, all transmitted status records will have a corresponding MAT position less than or equal to the safeMATposition.

Figure 8G:
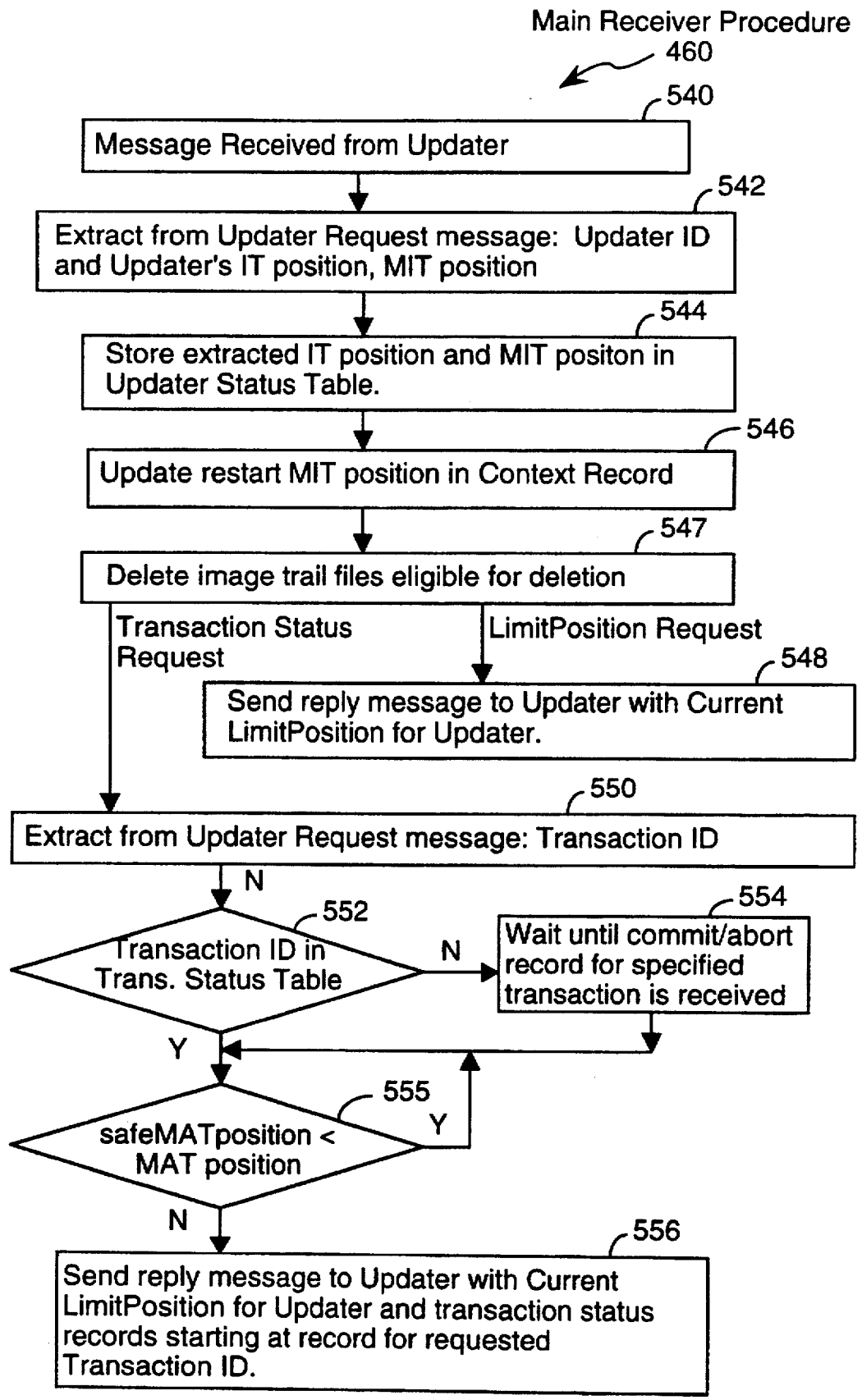
Figure 8H:
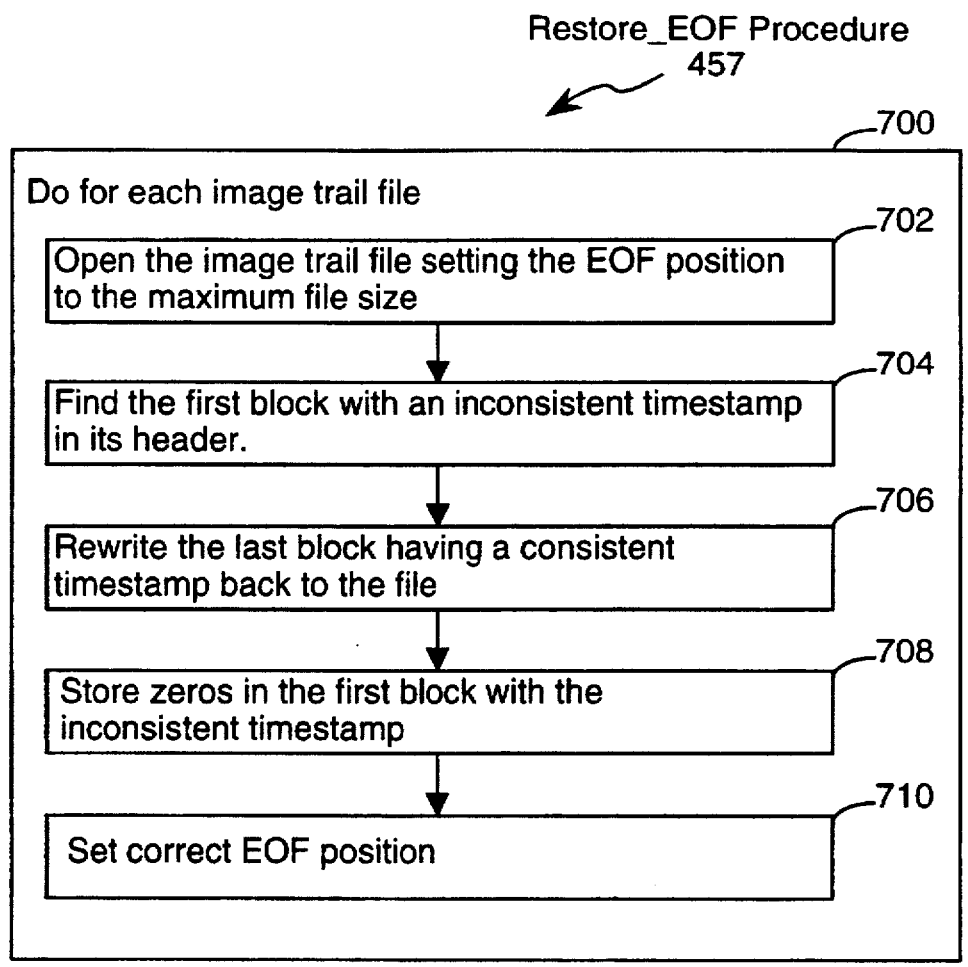

Referring to FIG. 8H, the receiver process includes a subprocedure 457 for restoring the end of file positions for each image trail file. This subprocedure is executed when the receiver process or its backup is restarted, as in the case of a failure that causes image trail files not to be properly closed. A file's end of file position indicates the last record in the file and is used by the receiver process to write to the next location in the file and by an updater process to read the records contained therein.

The receiver process restores the end of file position for each image trail file (700). To do so, the receiver process reads the entire contents of an image trail file by opening the file with read/write access to the maximum size of the file (702). The image trail timestamp 393 located in the header of each block 394 in the file is read and compared with the image trail timestamp for the file stored in the receiver's context record 270. The receiver performs this comparison for each block's header until it finds a timestamp that is inconsistent with the timestamp stored for the image trail file in the context record 270 (704). A position immediately preceding this block will become the new EOF position. The receiver process will then rewrite back to the file the maximum transfer size of data before the new EOF position (706). Preferably, the maximum transfer size of data is one buffer's worth of blocked data. A maximum transfer size of data containing zeros is written after the new EOF position (708). Lastly, the receiver process will restore the end of file position to the new EOF position, which is before the first block of zeros (710).

Alternate Embodiment of the Receiver Process

Figure 11:
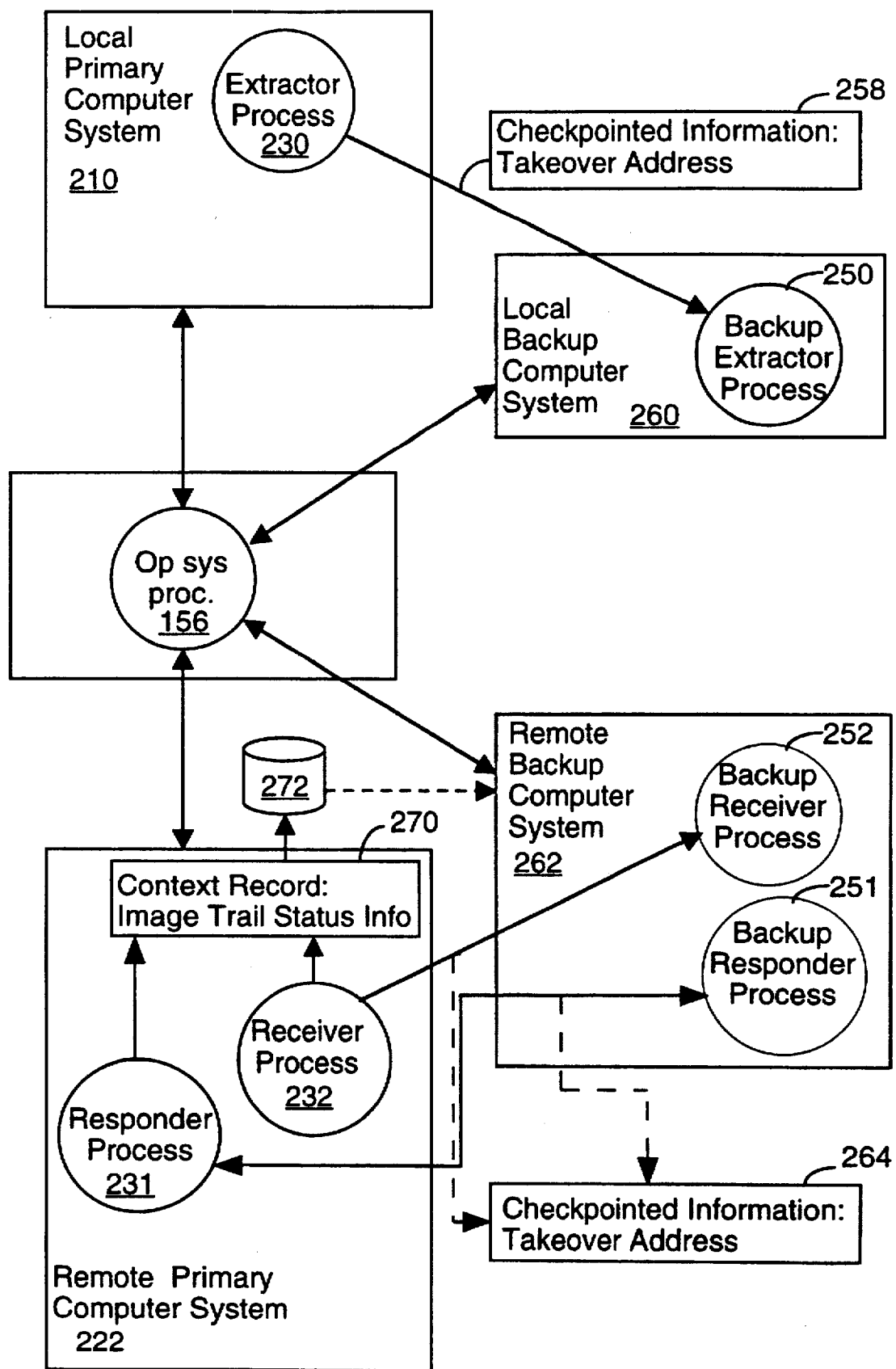
FIG. 11 is a conceptual representation of the checkpoint and failover procedures used in an alternate embodiment of the present invention.
Figure 12:
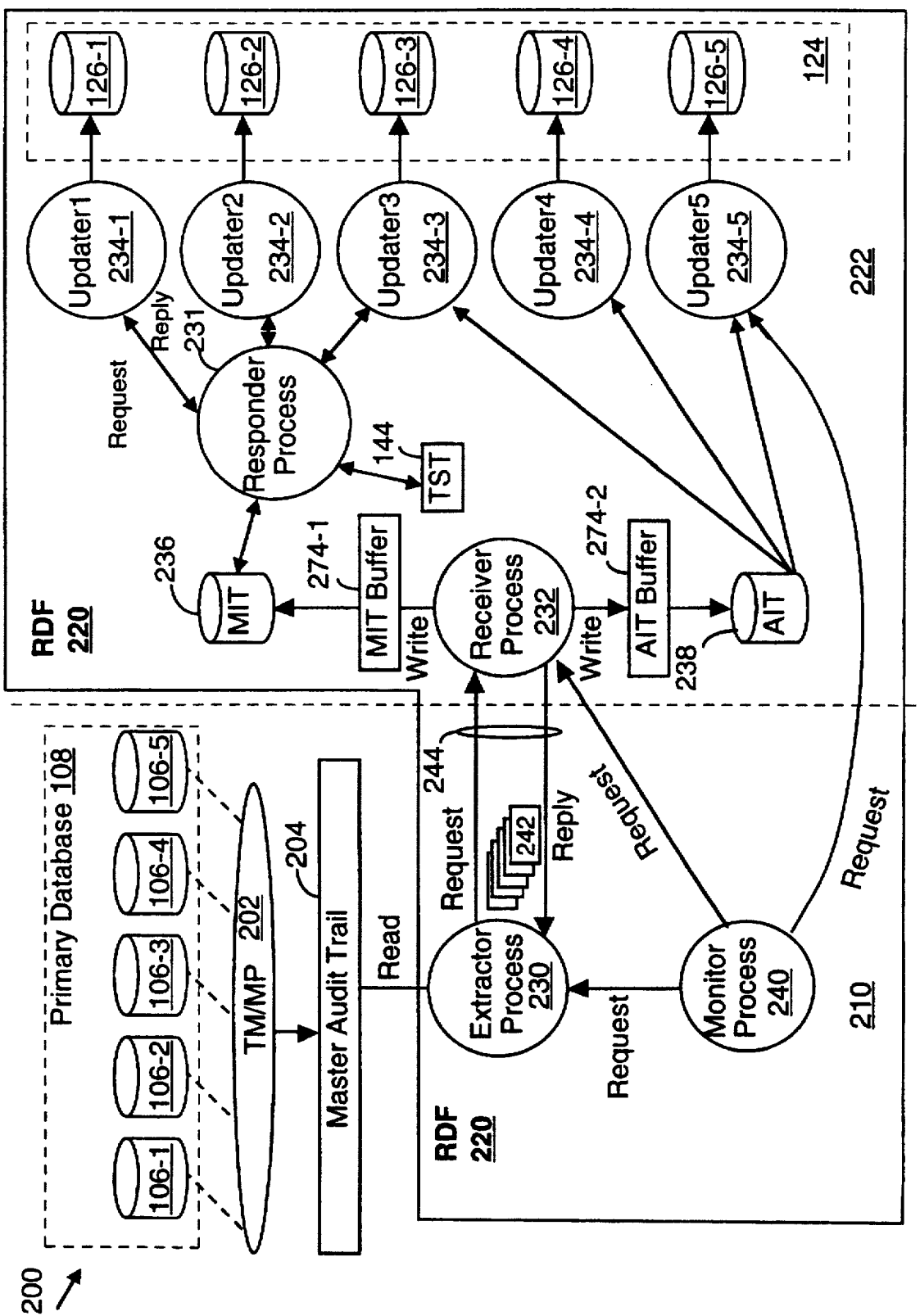
FIG. 12 is a block diagram of a database management system with a remote duplicate database facility in accordance with an alternate embodiment of the present invention.

FIGS. 11 and 12 represent the basic architecture of the computer system 200 utilizing the remote duplicate database facility 220 of an alternate embodiment of the present invention. Appendices 4–6 lists in pseudocode representation the procedures executed by the receiver process, the responder process, and the updater processes in the alternate embodiment.

The architecture of this embodiment utilizes a responder process 231 to perform some of the functions performed by the receiver process in the preferred embodiment. The receiver process 232 continues to process the message buffers 242 transmitted by the extractor process 230 and to distribute the audit records to the image trail buffers 274 and image trails 236, 238. However, the responder process 231 maintains the transaction status table 144 and handles requests from the updater processes 234. In this manner, the receiver process is able to more expeditiously process the audit records and the responder process can more accurately track the status audit records, especially in the case of a system failure.

The receiver process performs the same functions as previously described above except for steps 540 through 556 illustrated in FIG. 8G. The receiver process will no longer access the transaction status table or the updater status table. The updater process proceeds in the same manner as will be described below except that it will call the responder process rather than the receiver process to request information.

Figure 13A:
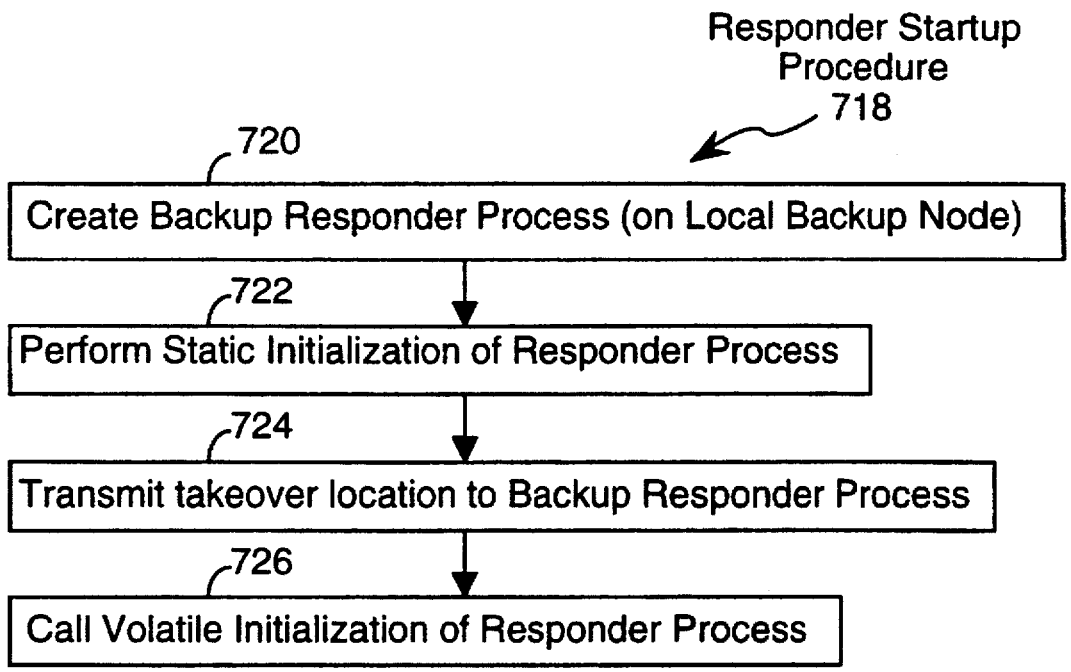
FIGS. 13A-13C are flowcharts of procedures executed by the responder process in an alternate embodiment of the present invention.
Figure 13B:
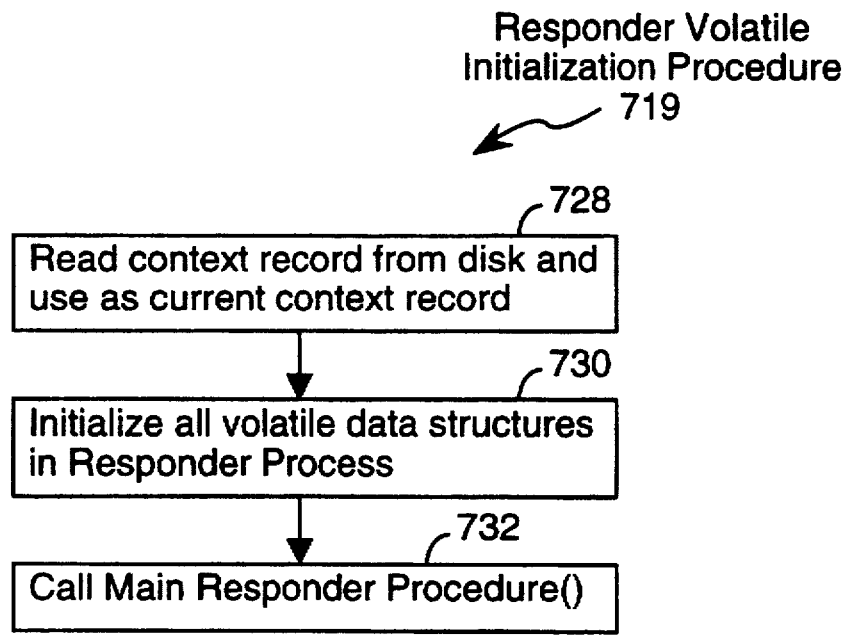
Figure 13C:
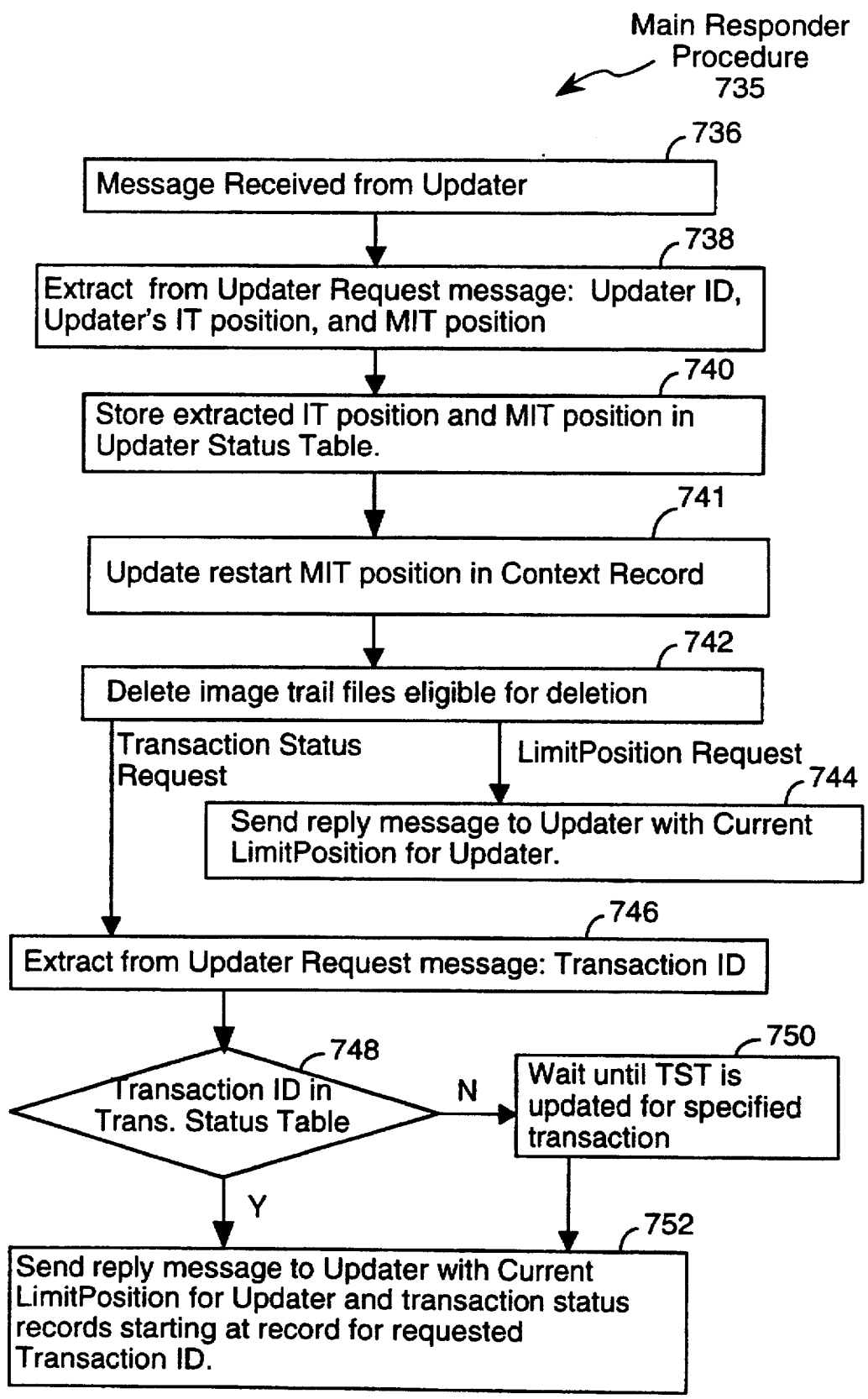

Referring to FIGS. 13A–13C, and the pseudocode in Appendix 5 the responder process 231 works as follows.

Referring to FIG. 13A, the Responder Startup Procedure 718 is called whenever the responder process 231 or its backup is started, as in the case of a failover or a transfer of control back to the primary responder process 231 from the backup responder process. The Startup procedure begins by creating a backup process (720). The startup procedure then performs a "static initialization" of the responder process (722), which means that all static data structures used by the responder process are allocated and initialized. Then a checkpoint operation is performed in which a takeover location is transmitted to the backup responder process (724). The takeover location is, in essence a program address, and in the preferred embodiment the takeover location is the program location at which execution of the Responder Volatile Initialization procedure 719 begins. Finally, the Responder Startup procedure calls (726) the Responder Volatile Initialization procedure 719.

Referring to FIG. 13B, the Responder Volatile Initialization procedure 719 is called during startup by the Responder Startup procedure 718. The Responder Volatile Initialization procedure 719 begins by reading the last stored Responder context record from disk and using it as the responder's current context record in volatile memory (728). Then the Responder Volatile Initialization procedure allocates and initializes all volatile data structures (730) used by the Responder process, including the updater status array 400 and the transaction status table 144. Then the Responder Volatile Initialization procedure calls (732) the main Responder procedure 735.

Referring to FIG. 13C, when a message is received from any updater process (736), the message is initially processed by extracting from the updater request message (A) the updater's identifier, (B) the updater's current image trail position, and (C) the MIT position read by the updater from a block header in the updater's image trail (738). The extracted Image trail position and the MIT position are stored in the Updater Status table (740). Using the updated information in the Updater Status table, the Restart MIT position in the receiver's context record is updated to be equal to the lowest MIT position for all the updaters (741). In addition, the responder process deletes any image trails eligible for deletion based on the updated image trail position values received from the updater (742).

If the received Updater request message is a LimitPosition request message, the responder reads the current LimitPosition for the updater and sends a reply message with that LimitPosition to the requesting updater (744).

If the received Updater request message is a Transaction Status request message, the responder extracts from the request message the Transaction identifier for which the updater is requesting a status value (746). Then the transaction status table 144 is inspected to see if the status of that transaction is known (748). If not, the receiver waits until a commit/abort record for the specified transaction is received from the extractor (750). Once the status of the transaction is known, a reply message is sent to the requesting updater (752). The reply message includes (A) the current LimitPosition for the updater, and (B) a set of transaction status records, starting with the record for the identified transaction. Preferably a substantial number of transaction records (e.g., 200 records, or all the status records in the TST 144 after the identified record if less than 200) is sent with each reply so as to reduce the number of Transaction Status requests sent by updaters.

Detailed Explanation of Updater Processes

Figure 9:
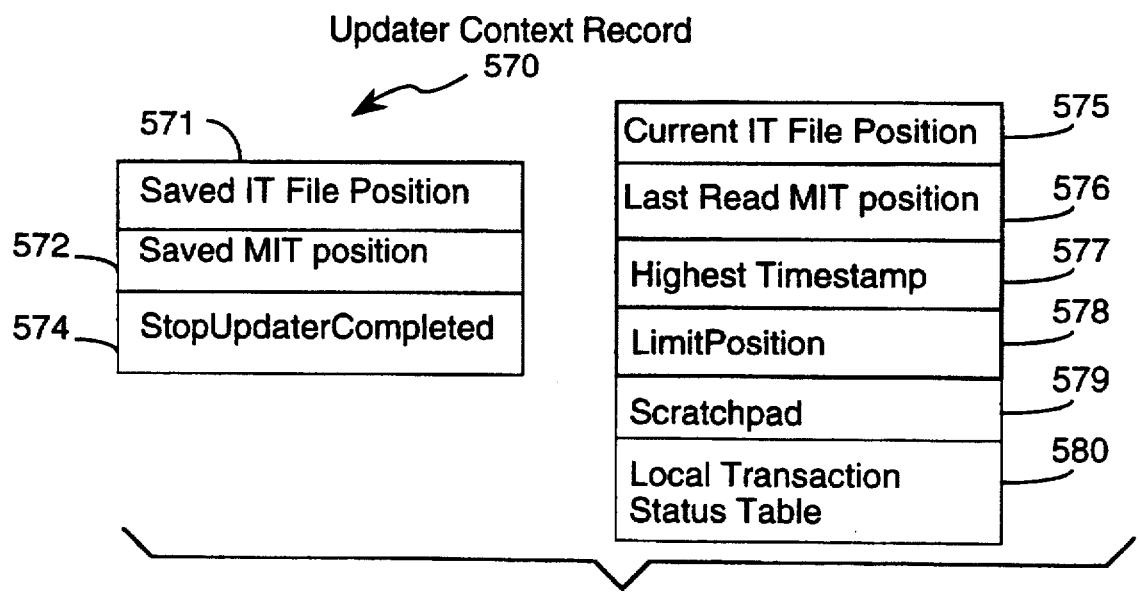
FIG. 9 is a block diagram of data structures, stored in primary memory, used by each updater process in a preferred embodiment of the present invention.

The primary data structures used by each updater process 234 in the preferred embodiment are shown in FIG. 9. Each updater process durably stores a context record 570 on a nonvolatile (disk) storage device on a periodic basis (e.g., once every 2 to 10 minutes, with 5 minutes being preferred). As shown in FIG. 9 the context record includes a saved image trail file position 571, a saved MIT position 572, and a StopUpdaterCompleted flag 574. Each updater also stores in volatile memory

- a current image trail file position 575,
- a "Last Read MIT Position 576, which is the last MIT position read by the updater from a block header in the updater's image trail,
- a Highest Timestamp value (577), equal to the highest timestamp of any audit record processed by the updater,
- a LimitPosition image trail file position (578),
- a scratch pad (579) for processing audit records, and
- a local transaction status table (580) provided to the updater by the receiver process.

The Highest Timestamp value 577 is not used by the RDF procedures discussed here. However, it is accessible by procedures executed by the Monitor process 240 for monitoring how far the updaters are running behind the TM/MP 202, and thus how long it would take the RDF system 220 to synchronize the backup database 124 with the primary database 108 if all transactions on the primary system were to stop.

Referring to FIGS. 10A–10E, and the pseudocode in Appendix 3, the updater processes 234 work as follows.

Figure 10A:
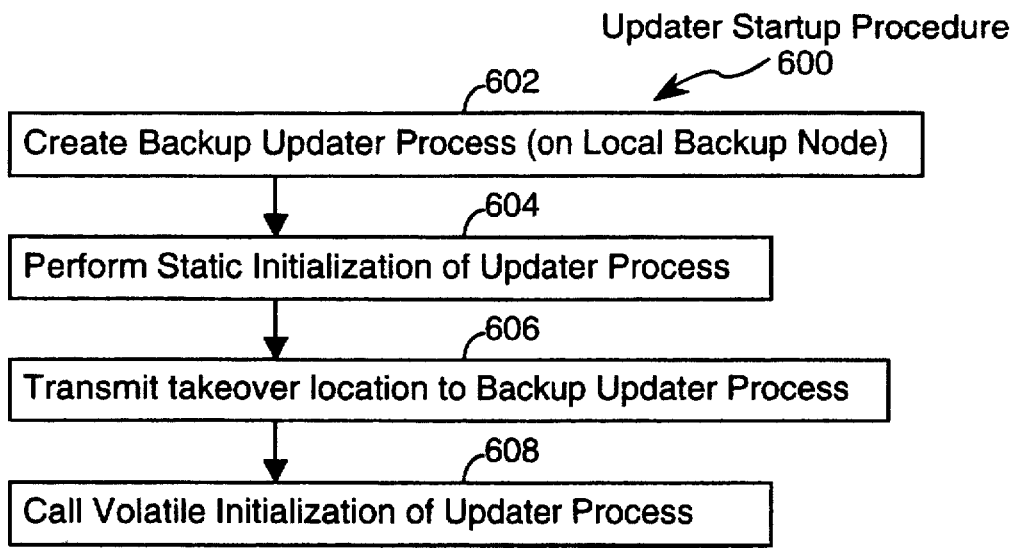
FIGS. 10A-10E are flowcharts of procedures executed by the updater processes in a preferred embodiment of the present invention.

Referring to FIG. 10A, the Updater Startup Procedure 600 is called whenever any updater process 234 is started. The Updater Startup procedure begins by creating a backup process (602). The startup procedure then performs a "static initialization" of the updater process (604), which means that all static data structures (such as a map of primary volumes to backup volumes) used by the updater process are allocated and initialized. Then a checkpoint operation is performed in which a takeover location is transmitted to the backup updater process (606). The takeover location is, in essence a program address, and in the preferred embodiment the takeover location is the program location at which execution of the Updater Volatile Initialization procedure 610 begins. Finally, the Updater Startup procedure calls (608) the Updater Volatile Initialization procedure 610.

Figure 10B:
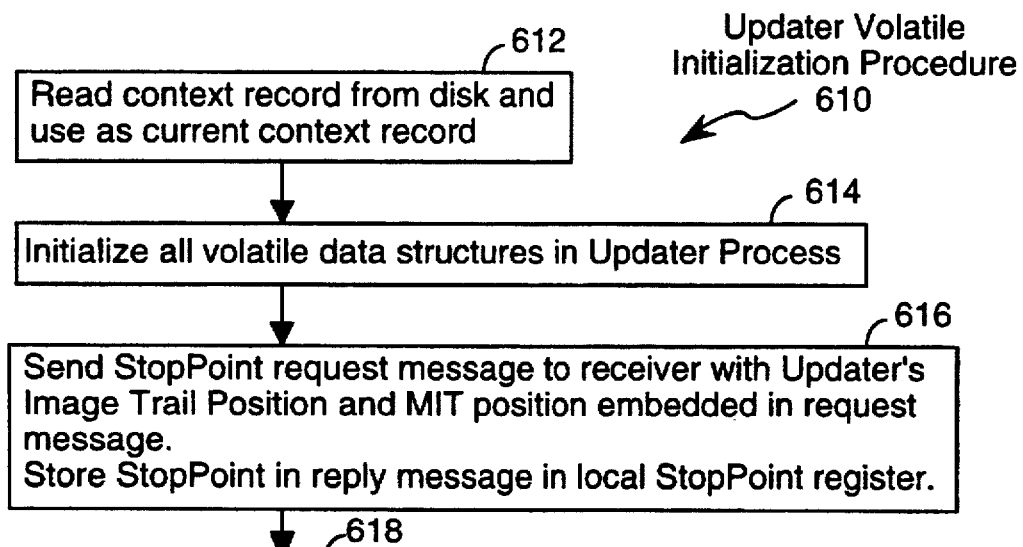

Referring to FIG. 10B, the Updater Volatile Initialization procedure 610 is called during startup by the Updater Startup procedure 600. The Updater Volatile Initialization procedure begins by reading the last stored Updater context record from disk and using it as the updater's current context record in volatile memory (612). Then the Updater Volatile Initialization procedure allocates and initializes all volatile data structures (614) used by the Updater process, including the scratchpad 579 and local transaction status table 580. Then the Updater Volatile Initialization sends a LimitPosition request message to the receiver with the updater's current image trail position and MIT position embedded in the message, and stores the LimitPosition value in the resulting reply message in its local LimitPosition register 578. Finally, the Volatile Initialization procedure calls (618) the main Updater procedure 620.

Figure 10C:
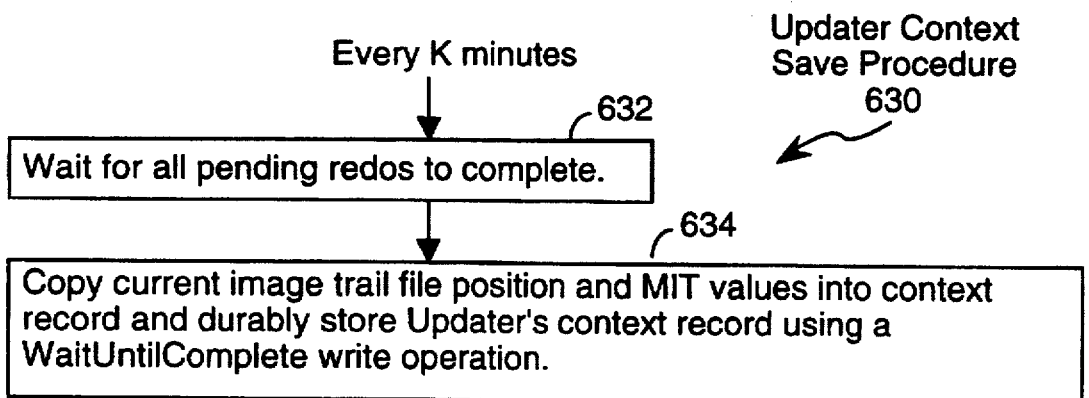
Figure 10D:
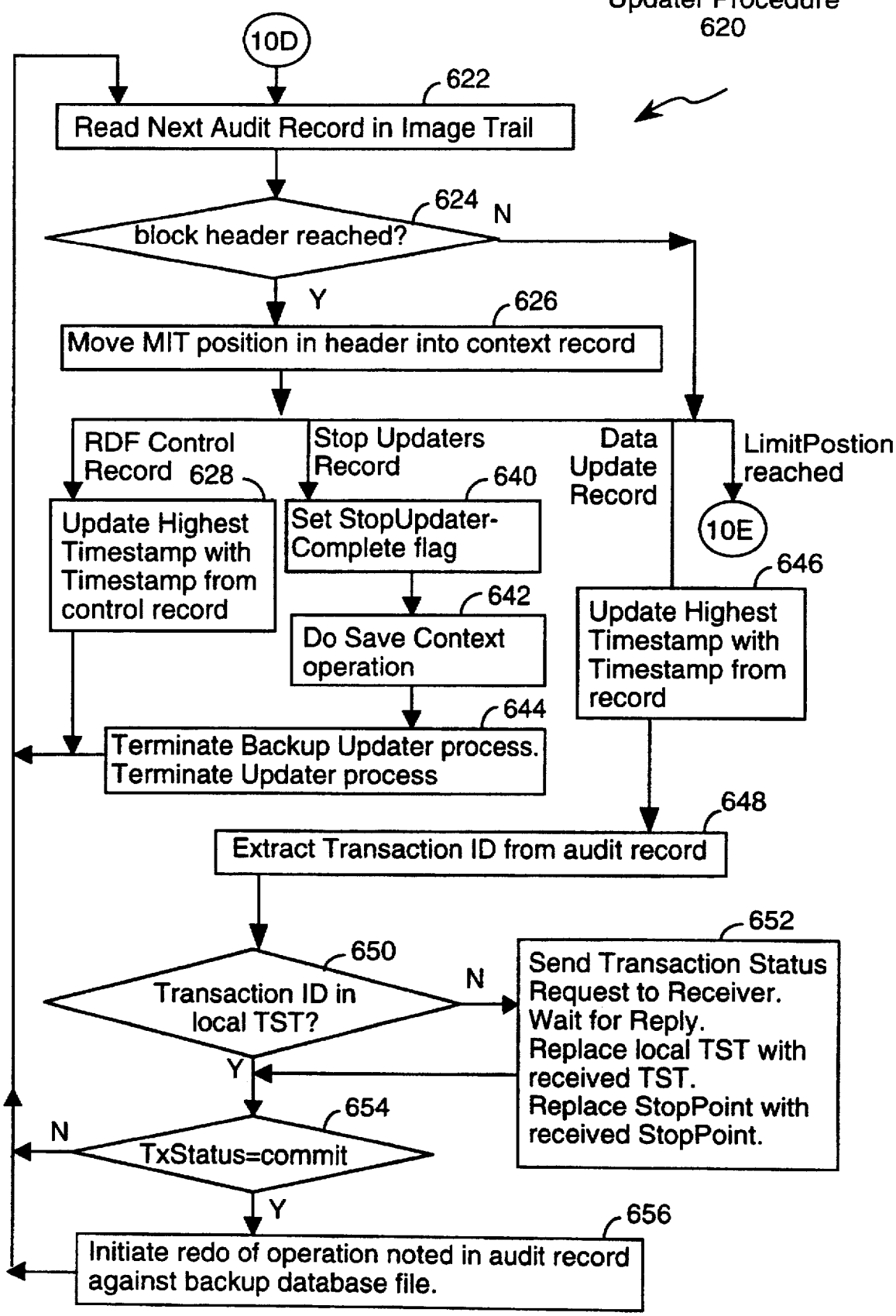
Figure 10E:
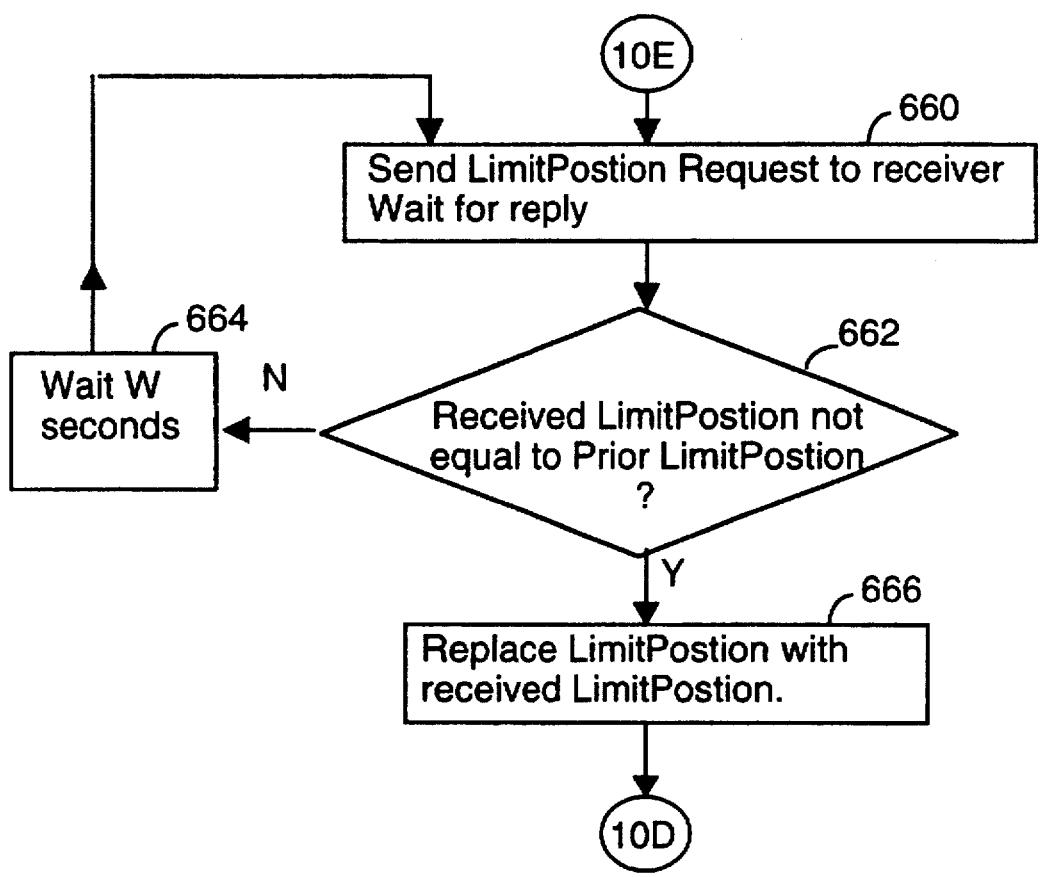

Referring to FIGS. 10C–10E, the Main Updater procedure 620 includes a subprocedure 630 for periodically saving the updater's context record. This subprocedure is called every K minutes, where K is preferably a value between 2 and 10 and is typically set to 5. The first step (632) of the updater context save procedure 630 is to wait for all currently pending redo operations to complete so that the data stored in the updater's backup disk volume is known to reflect all updates through the last audit record read by the updater. Then the updater context save procedure copies the current Image Trail File Position 575 and the current Last Read MIT position 576 into the corresponding fields of the context record 570, and durably stores the context record 570 on disk (634).

Referring to FIGS. 10D and 10E, the primary job of the Main Updater procedure 620 is to process audit image records in its image trail. At step 622 it reads the next audit record, if any, in the image trail. If, while reading that record, a 4 K byte block header is encountered (624), the MIT position denoted in the header is moved into the updater's current MIT position register 576 (626). register 577 is updated by storing in it the timestamp in the RDF control record (628). Then processing resumes with next audit record (622).

If the audit record just read is a "Stop Updaters " record, the "StopUpdaterCompleted flag 574 in the Updater context record 570 is set to True (640) and the Updater context save procedure 620 is called (642). The StopUpdaterCompleted flag 574 is read by the Monitor process to ensure that all Updaters have stopped and that all have processed their image trails through the StopUpdaters record (as opposed to stopping due to a failure). Then the updater's backup process is terminated and the updater process itself terminates (644). The updater process will startup again after the operator of the RDF system performs on the remote backup system the DDL operation that created the Stop Updaters audit record and then enters either the "Start Update" or "Takeover" command.

If the audit record just read is a database object update (i.e., data update) record, the Highest Timestamp register 577 is updated by storing in it the timestamp from the audit image record (646). The transaction identifier is extracted from the audit record (648). Then the local transaction status table 580 is inspected to see if it contains a status record for the identified transaction (582). If not, a Transaction Status Request message is sent to the receiver (652). When a reply message is received, the local transaction status table 580 is replaced with the transaction status table embedded in the reply message, and the LimitPosition stored in LimitPosition register 578 is replaced with the LimitPosition value embedded in the reply message.

Once the local status transaction table contains a status record for the identified transaction, the transaction status of that transaction is determined (654). If the transaction status is "commit." a redo of the database object update operation noted in the audit record is initiated against the backup database file (656). If the transaction status is "abort." the audit record is not further processed. In either case, processing resumes with next audit record (622).

When the attempt to read a next audit record (622) encounters an audit record at or beyond the LimitPosition value in LimitPosition register 578, a LimitPosition request message is sent to the receiver (660) to determine whether the LimitPosition for the updater has been advanced. When a reply message is received, the LimitPosition value in the received message is compared with the locally stored LimitPosition value (622). If the two are equal, the updater 234 cannot process any further audit image records. As a result, the updater waits for W seconds (664), where W is preferably a value between 1 and 10 and is typically set to 5, and then sends another LimitPosition request message to the receiver (660). This continues until a new LimitPosition value is received from the receiver. At that point the locally stored LimitPosition value in LimitPosition register 578 is replaced with the LimitPosition value in the received reply message, and then processing of audit image records resumes at step 622.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A distributed computer database system, comprising:

a local computer system having a local database stored on local memory media, application programs that modify the local database, and a transaction manager that stores audit records in a local audit trail reflecting those application program modifications to the local database; each audit record having an associated audit trail position in said local audit trail;

a remote computer system, remotely located from the local computer system, said remote computer system having a backup database stored on memory media associated with the remote computer system;

a communication channel for sending messages between said local computer system and said remote computer system; and a remote data duplication facility, partially located in said local computer system and partially located in said remote computer system, for maintaining virtual synchronization of said backup database with said local database, including:

an extractor process executed by said local computer system that extracts audit records from said local audit trail and transmits said extracted audit records to said remote computer system, a first subset of said audit records denoting updates to said local database, each audit record of said first subset having a transaction identifier indicating an associated transaction, each audit record of a second subset of said audit records indicating a status of one of said transactions;

a receiver process executed by said remote computer system that receives said audit records transmitted by said extractor process and distributes said audit records to one or more image trail buffers in said remote computer system, each image trail buffer associated with an image trail file;

one or more updater processes executed by said remote computer system, wherein each updater process reads said audit records in an assigned one of said image trail files and initiates redo operations of updates specified in said audit records against an assigned portion of said backup database;

said image trail buffers having at least one master image trail buffer and one or more auxiliary image trail buffers, each of said auxiliary image trail buffers including audit records of said first subset, said master image trail buffer including audit records of said second subset;

each of said updater processes including instructions to request a specified status audit record prior to initiating redo operations associated with a corresponding audit record; and said receiver process including instructions to flush each of said auxiliary image trail buffers to each of said respective image trail files before said master image trail buffer is flushed to its associated image trail file and to store in a memory a safeMATposition denoting an audit trail position of a last status audit record stored in said image trail file associated with said master image trail buffer.

2. The system of claim 1, wherein said receiver process further includes instructions for storing one or more status audit records in a transaction status table, said transaction status table used to retrieve one or more status records in response to said status requests; and wherein said receiver process further includes instructions to respond to a status request associated with an update audit record from one of said updater processes by searching for a status audit record stored in said transaction status table whose transaction identifier matches said requested audit record's transaction identifier, said receiver process transmitting said matched status audit record to said requesting updater process once said safeMATposition equals or exceeds said requested audit record's audit trail position.

3. The system of claim 2, wherein said receiver process further includes instructions to transmit in response to said status request additional status audit records whose corresponding audit trail position exceeds said requested update audit record's audit trail position and is less than said safeMATposition.

4. The system of claim 1, wherein each of said image trail files includes one or more blocks of audit records, each block having a block header, each of said image trail files having an end of file position;

said receiver process further includes instructions to determine a timestamp for each of said image trail files when said image trail file is created;

said receiver process further includes instructions to store said timestamp in each block header of said respective image trail file when one or more audit records are written into a corresponding block; and said receiver process includes instructions to set said end of file position of each of said image trail files to a position at or before a first block header having a timestamp whose value does not match said created timestamp when a predefined condition occurs.

5. The system of claim 1, wherein said extractor process includes a plurality of message buffers and instructions for buffering groups of said extracted audit records together in said message buffers and transmitting said message buffers to said remote computer system, each transmitted message buffers having an associated sequence number, wherein sequentially transmitted message buffers have associated sequence numbers that follow a predefined sequence; said extractor process instructions including instructions for continuing, after transmitting a first one of said message buffers to said remote computer system, to buffer groups of said extracted audit records in other ones of said message buffers and for transmitting said other message buffers to said remote computer system.

6. The system of claim 5, wherein said receiver process further includes instructions to store an expected message sequence number and a restart audit trail position based on said audit trail positions associated with said audit records in said received message buffer, to receive said message buffers transmitted by said extractor process, to respond to each received message buffer whose associated message sequence number does not match said expected message sequence number by transmitting an error message to said extractor process, and to respond to each received message buffer whose associated message sequence number matches said expected message sequence number by sending a reply message to said extractor process to acknowledge receipt of each said message buffer.

7. The system of claim 6, wherein said extractor process further includes instructions:

to respond to said error message by obtaining said restart audit trail position from said receiver process; and to extract said audit records from said local audit trail starting at restart audit trail position.

8. The system of claim 1, wherein said remote data duplication facility further comprises a responder process for storing one or more of said status audit records in a transaction status table and for retrieving one or more status records from said transaction status table in response to said status requests.

9. The system of claim 8, wherein said responder process further includes instructions to respond to one of said status requests by searching for a status audit record stored in said transaction status table whose transaction identifier matches said requested audit record's transaction identifier and for transmitting said matching status audit record to said requesting updater process.

10. The system of claim 9, wherein said responder process includes instructions to reconstruct said transaction status table from those records stored in said image trail file associated with said master image trail buffer.

11. A memory for storing data for access by programs being executed on a remote data processing system having a database system, said remote data processing system in communication with at least one local data processing system including a local database system that is synchronized with said remote database system, said memory comprising:

a receiver process executed by said remote data processing system that receives a plurality of audit records reflecting application program modifications to said local database system, said audit records stored in a local audit trail located in said local data processing system and having an associated audit trail position in said local audit trail;

said receiver process distributing said audit records to one or more image trail buffers, each image trail buffer having an associated image trail file corresponding to an assigned updater process that reads said audit records and initiates redo operations of database modifications denoted in at least a first subset of said read audit records against an assigned portion of said remote database system, each of said audit records in said first subset having a transaction identifier denoting a corresponding transaction;

said image trail buffers including at least one master image trail buffer associated with a master image trail file including a second subset of said audit records, each audit record of said second subset indicating a status associated with one of said transactions; and said receiver process including instructions to flush each of said image trail buffers to each of said respective image trail files before said master image trail buffer is flushed to said master image trail file and to store in a memory a safeMATposition denoting an audit trail position of a last status audit record stored in said master image trail file.

12. The memory of claim 11, wherein said receiver process further includes instructions for storing one or more status audit records in a transaction status table, said transaction status table used to retrieve one or more status records in response to said status requests; and wherein said receiver process further includes instructions to respond to a status request from one of said updater processes associated with an audit record of said first subset by searching for a status audit record stored in said transaction status table whose transaction identifier matches said requested audit record's transaction identifier, said receiver process transmitting said matched status audit record to said requesting updater process once said safeMATposition equals or exceeds said requested audit record's audit trail position.

13. The memory of claim 11, wherein each of said image trail files includes one or more blocks of audit records, each block having a block header, each of said image trail files having an end of file position;

said receiver process further includes instructions to determine a timestamp for each of said image trail files when said image trail file is created;

said receiver process includes instructions to store said timestamp in each block header of said respective image trail file when one or more audit records are written into a corresponding block; and said receiver process includes instructions to set said end of file position of each of said image trail files to a position before at or a first block header having a timestamp whose value does not match said created timestamp when a predefined condition occurs.

14. The memory of claim 11, wherein said receiver process includes instructions to receive a plurality of message buffers transmitted from said local data processing system, each transmitted message buffer including a plurality of said audit records, each transmitted message buffer having an associated sequence number, wherein sequentially transmitted message buffers have associated sequence numbers that follow a predefined sequence;

said receiver process includes instructions to respond to each received message buffer whose associated message sequence number does not match an expected message sequence number by transmitting an error message to said transmitting local data processing system;

said receiver process includes instructions to respond to each received message buffer whose associated message sequence number matches said expected sequence number by updating said expected message sequence number in accordance with said predefined sequence; and said receiver process includes instructions to store a restart audit trail position based on said audit trail positions associated with said audit records in said received message buffer and transmits said restart audit trail position to said local data processing system when so requested.

15. The memory of claim 11, wherein each of said updater processes requests a specified status audit record prior to initiating said redo operations associated with a corresponding update audit record; and said memory including a responder process for storing one or more of said status audit records in a transaction status table and for retrieving one or more status records from said transaction status table in response to said status requests.

16. The memory of claim 15, wherein said responder process includes instructions to respond to a status request associated with an audit record of said first subset by one of said updater processes by searching for a status audit record stored in said transaction status table whose transaction identifier matches said requested audit record's transaction identifier and for transmitting said matching status audit record to said requesting updater process.

17. The memory of claim 16, wherein said responder process includes instructions to reconstruct said transaction status table from those records stored in said master image trail file.

18. A method for operating a distributed computer system including a local computer system having a database system, said local computer system in communication with a remote computer system having a backup database system at least partially replicating said local database system, said method comprising the steps of:

receiving a plurality of audit records extracted from an audit trail located in said local database system, said audit records reflecting application program modifications to said local database system, each audit record having an associated audit trail position in said audit trail, a first subset of said audit records denoting updates made to said local database system and including a transaction identifier denoting an associated transaction, each audit record of a second subset of said audit records denoting a status of one of said transactions and having a transaction identifier denoting said transaction;

distributing each of said update audit records to one of a set of one or more image trail buffers, each image trail buffer associated with an image trail file assigned to at least one updater process associated with said remote computer system, each said updater process reading audit records stored in said assigned image trail file and initiating redo operations specified in said first subset of audit records against a corresponding portion of said backup database system;

distributing each of said status audit records to a master image buffer associated with a master image trail file in said remote computer system;

prior to flushing said status audit records in said master image buffer to said master image trail file, flushing said update audit records in each of said image trail buffers to said respective image trail file; and updating a safeMATposition with an audit trail position of a last stored status audit record written to said master image trail file.

19. The method of claim 18, updating a transaction status table stored in said remote computer system with one or more of said status audit records stored in said master image trail buffer;

receiving a request for a status of a specified update audit record from one of said updater processes;

responding to said status request by searching for one of said status audit records in said transaction status table matching said specified update audit record's transaction identifier; and returning said matched status audit record when said safeMATposition equals or exceeds said specified update audit record's audit trail position.

20. The method of claim 19, returning one or more status audit records from said transaction status table whose audit trail positions exceed said specified update audit record's audit trail position and is less than said safeMATposition.

21. The method of claim 19, restoring contents of said transaction status table when a prescribed condition occurs from status audit records stored in said master image trail file whose audit trail positions are less than said safeMATposition.

22. The method of claim 18, wherein said receiving step further comprises the steps of:

receiving a plurality of message buffers from said local computer system, each message buffer including at least one audit record and having an associated sequence number, wherein sequentially transmitted message buffers have associated sequence numbers that follow a predefined sequence;

storing an expected sequence number based on said associated sequence numbers of said received message buffers and storing a restart audit trail position based on said audit trail positions associated with said audit records in said received message buffers;

sending a reply message to said local computer system for each transmitted message buffer whose associated message sequence number matches said expected sequence number, said reply message enabling reuse of said message buffer; and transmitting an error message to said local computer system indicating the need to resynchronize said transmissions at said restart audit trail position for each transmitted message buffer whose associated message sequence number does not match said expected sequence number.

23. The method of claim, 18, wherein each of said image trail files includes one or more blocks of audit records, each block having a block header, each of said image trail files having an end of file position;

determining a timestamp for each of said image trail files, each timestamp identifying when a respective one of said image trail files was created;

wherein said step of distributing said update audit records further comprises the step of dispersing said update audit records to one or more blocks of said respective image trail buffer, each block header containing said created timestamp;

wherein said step of distributing said status audit records further comprises the step of dispersing said status audit records to one or more blocks of said master image trail buffer, each block header containing said respective created timestamp; and restoring each of said end of file positions for each image trail file when a prescribed condition occurs, said restoration based on said respective created timestamp located in each block header of said image trail file.

24. The method of claim 23, said restoring step including setting said end of file position of each of said image trail files to a position at or before a first block header having a timestamp whose value does not match said created timestamp when a predefined condition occurs.

* * * * *